United States Patent [19]
Walters et al.

[11] Patent Number: 6,112,058
[45] Date of Patent: Aug. 29, 2000

[54] METHOD AND APPARATUS FOR WIRELESS COMMUNICATION EMPLOYING CONFIDENCE METRIC PROCESSING FOR BANDWIDTH REDUCTION

[75] Inventors: Andrew John Walters, Mountain View; John Walker Wallerius, Fremont; John Andrew Vastano, Palo Alto; Lance Kazumi Uyehara, San Jose, all of Calif.

[73] Assignee: SC-Wireless Inc., San Jose, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/866,700

[22] Filed: May 30, 1997

Related U.S. Application Data

[63] Continuation-in-part of application No. 08/801,711, Feb. 14, 1997, and a continuation-in-part of application No. 08/544,913, Oct. 18, 1995, Pat. No. 5,715,516, and a continuation-in-part of application No. 08/634,141, Apr. 19, 1996, Pat. No. 5,805,576.

[51] Int. Cl.[7] ............................................ H04Q 7/00
[52] U.S. Cl. .................................. 455/67.1; 455/33.1
[58] Field of Search ................................. 455/67.1, 33.1, 455/33.2, 33.4, 34.1, 54.1, 56.1; 370/337, 338, 401, 320, 321

[56] References Cited

U.S. PATENT DOCUMENTS 5,715,516   2/1998   Howard et al. .................... 455/33.1
5,805,576   9/1998   Worley, III et al. ................ 370/337

*Primary Examiner*—Daniel S. Hunter
*Assistant Examiner*—Pablo N. Tran
*Attorney, Agent, or Firm*—David E. Lovejoy

[57] ABSTRACT

A communication system having a plurality of forward channel communications and a plurality of corresponding reverse channel communications from and to a plurality of mobile users. A plurality of collectors are distributed at macro-diverse locations for receiving reverse channel signals from the users which are processed to yield one or more sequences of data bits as a burst and corresponding one or more initial confidence metrics for each bit. The initial confidence metrics have an initial range, $a_{in}$, represented by an initial number of bits, $\gamma_{in}$, and are processed to form processed confidence metrics having a processed range, $a_p$, represented by a processed number of bits, $\gamma_p$. The collectors forward these reverse channel signals including the data bits and corresponding processed confidence metrics to aggregators. The aggregators combine the multiple collector signals for the same user received from the macro-diverse collectors. The combining of multiple collector signals for the same user results in an output bit stream for the user with fewer bit errors.

38 Claims, 9 Drawing Sheets

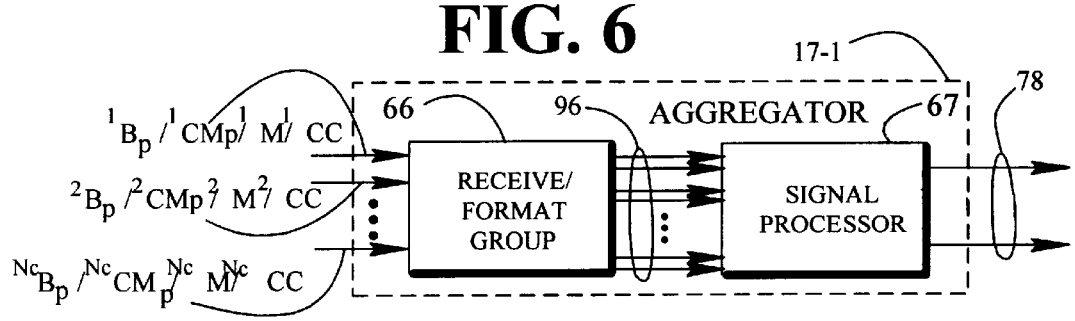
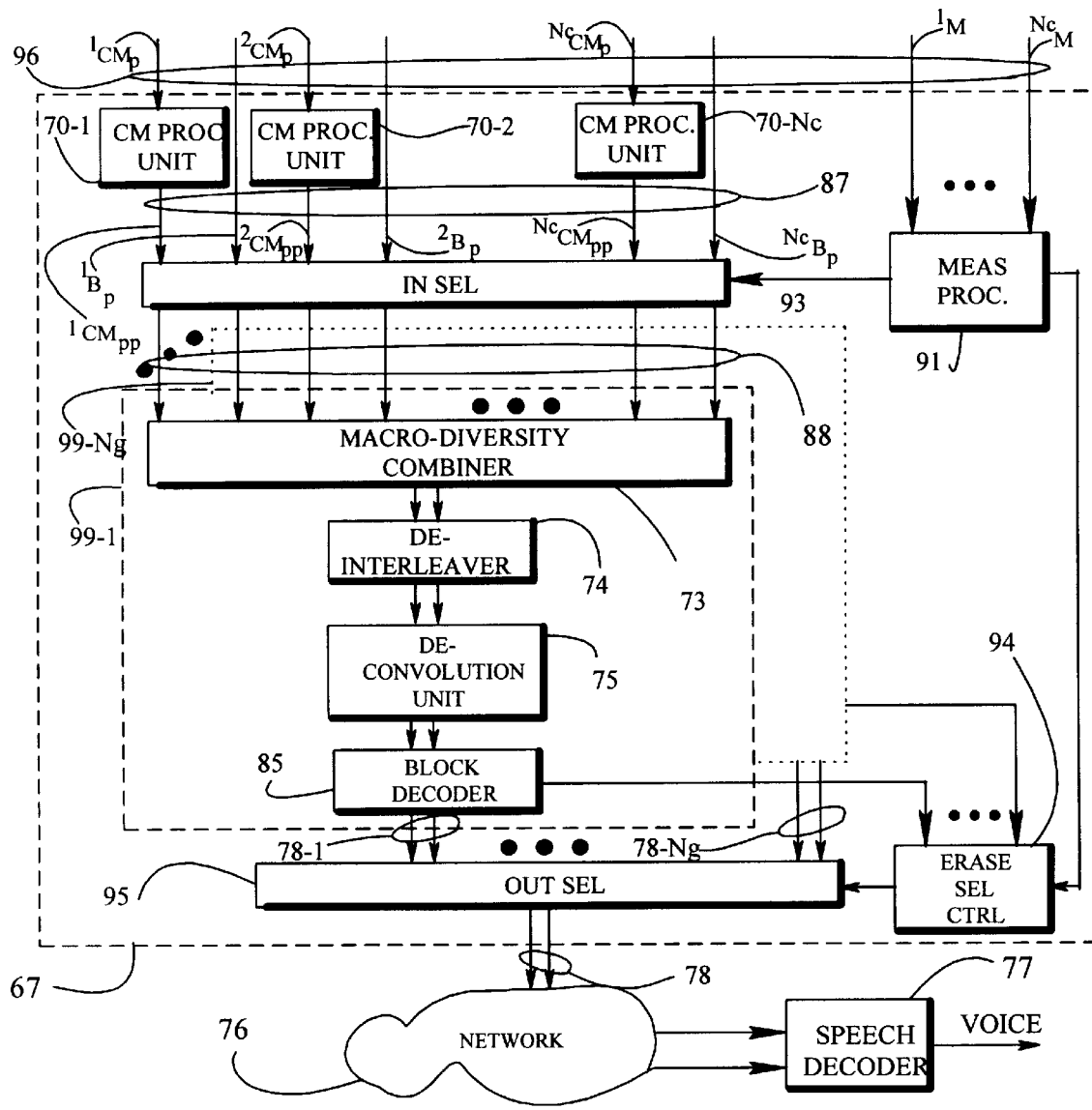

METHOD AND APPARATUS FOR WIRELESS COMMUNICATION EMPLOYING CONFIDENCE METRIC PROCESSING FOR BANDWIDTH REDUCTION

CROSS REFERENCE

This application is a continuation-in-part of application SC/Ser. No. 08/801,711 filed Feb. 14, 1997 entitled METHOD AND APPARATUS FOR WIRELESS COMMUNICATION EMPLOYING AGGREGATION FOR DIGITAL SIGNALS, assigned to the same assignee as this application.

This application is a continuation-in-part of application SC/Ser. No. 08/544,913 filed Oct. 18, 1995 now U.S. Pat. No. 5,715,516, entitled METHOD AND APPARATUS FOR WIRELESS COMMUNICATION EMPLOYING COLLECTOR ARRAYS, assigned to the same assignee as this application.

This application is a continuation-in-part of application SC/Ser. No. 08/634,141 filed Apr. 19, 1996 now U.S. Pat. No. 5,805,576, entitled METHOD AND APPARATUS FOR TDMA WIRELESS COMMUNICATION EMPLOYING COLLECTOR ARRAYS FOR RANGE EXTENSION.

BACKGROUND OF THE INVENTION

The present invention relates to the field of two-way wireless communication systems and more specifically to methods and apparatus for communication with mobile telephone users (cellular and personal communication systems), basic exchange telecommunications radio, wireless data communications, two-way paging and other wireless systems.

Conventional Cellular Systems

Present day cellular mobile telephone systems developed due to a large demand for mobile services that could not be satisfied by earlier systems. Cellular systems "reuse" frequency within a group of cells to provide wireless two-way radio frequency (RF) communication to large numbers of users. Each cell covers a small geographic area and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The switches provide for the hand-off of users from cell to cell and thus typically from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

The base station in addition to providing RF connectivity to users also provides connectivity to a Mobile Telephone Switching Office (MTSO). In a typical cellular system, one or more MTSO's will be used over the covered region. Each MTSO can service a number of base stations and associated cells in the cellular system and supports switching operations for routing calls between other systems (such as the PSTN) and the cellular system or for routing calls within the cellular system.

Base stations are typically controlled from the MTSO by means of a Base Station Controller (BSC). The BSC assigns RF carriers to support calls, coordinates the handoff of mobile users between base stations, and monitors and reports on the status of base stations. The number of base stations controlled by a single MTSO depends upon the traffic at each base station, the cost of interconnection between the MTSO and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there may be a transfer period of time during which the forward and reverse communications to the mobile user are severed with the base station for the first cell and are not established with the second cell.

Conventional cellular implementations employ one of several techniques to reuse RF bandwidth from cell to cell over the cellular domain. The power received from a radio signal diminishes as the distance between transmitter and receiver increases. Conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere with the carrier in the given cell. The determination of how far away reuse sites must be and of what constitutes significant interference are implementation-specific details.

TDMA Conventional Cellular Architectures

In TDMA systems, time is divided into time slots of a specified duration. Time slots are grouped into frames, and the homologous time slots in each frame are assigned to the same channel. It is common practice to refer to the set of homologous time slots over all frames as a time slot. Each logical channel is assigned a time slot or slots on a common carrier band. The radio transmissions carrying the communications over each logical channel are thus discontinuous. The radio transmitter is off during the time slots not allocated to it.

Each separate radio transmission, which should occupy a single time slot, is called a burst. Each TDMA implementation defines one or more burst structures. Typically, there are at least two burst structures, namely, a first one for the initial access and synchronization of a user to the system, and a second one for routine communications once a user has been synchronized. Strict timing must be maintained in TDMA systems to prevent the bursts comprising one logical channel from interfering with the bursts comprising other logical channels in the adjacent time slots. Space Diversity Combining signals from a single source that are received at multiple spaced-apart antennas is called space diversity. Micro-diversity is one form of space diversity that exists when two or more receiving antennas are located in close proximity to each other (within a distance of several meters for example) and where each antenna receives the signals from the single source. In micro-diversity systems, the received signals from the common source are processed and combined to form an improved quality resultant signal for that single source. Micro-diversity is effective against Rayleigh or Rician fading or similar disturbances. The terminology micro-diverse locations means, therefore, the locations of antennas that are close together and that are only separated enough to be effective against Rayleigh or Rician fading or similar disturbances. The signal processing for micro-diverse locations can occur at a single physical location and hence micro-diversity processing need not adversely impact reverse channel bandwidth requirements.

Macro-diversity is another form of space diversity that exists when two or more receiving antennas are located far apart from each other (at a distance much greater than several meters, for example, ten kilometers) and where each antenna receives the signals from the single source. In macro-diversity systems, the received signals from the single source are processed and combined to form an improved quality resultant signal for that single source. The terminology macro-diversity means that the antennas are far enough apart to have decorrelation between the mean signal levels for signals from the single source. The terminology macro-diverse locations means, therefore, the locations of antennas that are far enough apart to achieve that decorrelation. Since macro-diversity processing involves forwarding of signals to a common processing location, an adverse impact on channel bandwidth tends to result from macro-diversity processing.

Shadow Fading

The decorrelation of mean signal levels employed in macro-diversity systems is due to local variability in the value of signal strength diminution to each of the spaced-apart receiving antennas. This local variability exists on length scales above Rayleigh or Rician fading and is due to terrain effects, signal blocking by structures or vegetation, and any other variability that exists in a particular environment. This variability is referred to as shadow fading. Decorrelation lengths for shadow fading may be as small as length scales just above Rayleigh fading length scales (for example, less than a few meters), or may be as large as several kilometers.

Signal Quality Enhancements

In order for diversity combining to increase the quality of a signal, some measure of the quality of the input signals must be generated. One of the difficult problems in designing space-diversity algorithms is finding an accurate measure of precombination decision reliability, which can be computed in real-time. While micro-diversity systems improve system quality by ameliorating the effects of Rayleigh fading, which is short-term in nature, they are not very effective in combatting shadow fading, which is caused by effects such as an obstruction coming between a transmitter and a receiving antenna. While macro-diversity systems combine received signals from a number of receivers spaced far apart in space to combat shadow fading, in order for macro-diversity combining to increase the quality of the resulting signal, some measure of the quality of the individual received signals is necessary.

In the above cross-referenced application entitled METHOD AND APPARATUS FOR WIRELESS COMMUNICATION EMPLOYING AGGREGATION FOR DIGITAL SIGNALS, a communication system is disclosed having a plurality of forward channel communications and a plurality of corresponding reverse channel communications from and to a plurality of mobile users. A plurality of collectors is distributed at macro-diverse locations for receiving reverse channel signals from the users. Each of the collectors typically includes micro-diversity receivers for receiving the reverse channel signals from users. The collectors forward these reverse channel signals to the aggregators. The aggregators combine the received signals from the macro-diverse collectors. The combining of multiple collector signals for the same user that are both macro-diverse and micro-diverse results in an output bit stream with fewer bit errors.

In one embodiment of that cross-referenced application, the micro-diverse combining occurs in the collectors and the macro-diverse combining occurs in the aggregators. In an alternative embodiment, some or all of the micro-diverse combining occurs along with the macro-diverse combining in the aggregators.

In the aggregation method of the cross-referenced application, the signals from users received at collector antennas are processed to yield one or more sequences of bits and corresponding one or more confidence metrics for each bit. Inputs from the same user through multiple micro-diverse antennas at each collector are combined to reduce errors resulting from Rayleigh and similar disturbances. Signals from the same user are processed to form sequences of bits and corresponding confidence metric vectors from multiple macro-diverse collectors. These signals are combined in an aggregator to reduce errors resulting from shadow fading and similar disturbances. Increasing the number of confidence metric bits (that is increasing the amount of bandwidth) tends to increase the quality of signals (particularly weak signals) while reducing the bandwidth available for other uses (hence reducing the capacity of the system or the quality of other parts of the system). An appropriate balance between reverse channel bandwidth, aggregated signal quality and system capacity is required. The aggregator processes the data from the multiple collectors and combines and decodes the resulting streams to reduce the probability of bit errors. The combining process utilizes the confidence metrics to make a final decision on each bit. The number of bits of data used in the cross-referenced application can be large and hence there is a need to reduce the amount of data allocated to confidence metrics.

In accordance with the above background, the communications problems resulting from interference, noise, fading and other disturbances create a need for improved wireless communication systems which overcome the interference problems and other limitations of conventional cellular systems.

SUMMARY OF THE INVENTION

The present invention is a communication system having a plurality of forward channel communications and a plurality of corresponding reverse channel communications from and to a plurality of mobile users. A plurality of collectors are distributed at macro-diverse locations for receiving reverse channel signals from the users. The signals from users received at collector antennas are processed to yield one or more sequences of data bits as a burst and corresponding one or more initial confidence metrics for each bit where the confidence metrics for the burst form an initial confidence metric vector. The initial confidence metrics in the initial confidence metric vector have an initial range, $a_{in}$, represented by an initial number of bits, $\gamma_{in}$, and are processed to form processed confidence metrics having a processed range, $a_p$, represented by a processed number of bits, $\gamma_p$, and which form the processed confidence metric vector. The collectors forward these reverse channel signals including the data bits and corresponding processed confidence metrics to aggregators. The aggregators combine the multiple collector signals for the same user received from the macro-diverse collectors. The combining of multiple collector signals for the same user results in an output bit stream for the user with fewer bit errors.

The processing of the initial confidence metrics to form processed confidence metrics is performed with a number of different variations. In one embodiment, the number of processed confidence metrics in the processed confidence metic vector are fewer than the number of initial confidence metrics in the initial confidence metic vector. The reduction in the number of confidence metrics is achieved by combining two or more initial confidence metrics into a single processed confidence metric and in this manner the total number of bits allocated to the processed confidence metric vector is less than the number of bits in the initial confidence metric vector.

In another embodiment, the processed range, $a_p$, and the processed number of bits, $\gamma_p$, are less than the initial range, $a_{in}$, and the initial number of bits, $\gamma_{in}$, respectively. The reduction in the number of initial confidence metric bits to a fewer number of bits in the processed confidence metrics causes the total number of bits allocated to the processed confidence metric vector to be less than the number of bits in the initial confidence metric vector.

In other embodiments, both the number of confidence metrics and the number of bits per confidence metric are reduced to cause the total number of bits allocated to the processed confidence metric vector to be less than the number of bits in the initial confidence metric vector.

The foregoing and other objects, features and advantages of the invention will be apparent from the following detailed description in conjunction with the drawings.

BRIEF DESCRIPTION OF THE DRAWINGS

FIG. 6 depicts a block diagram representation of an aggregator.

FIG. 7 depicts a detailed representation of an embodiment of the aggregator of FIG. 3.

DETAILED DESCRIPTION

Figure 1:
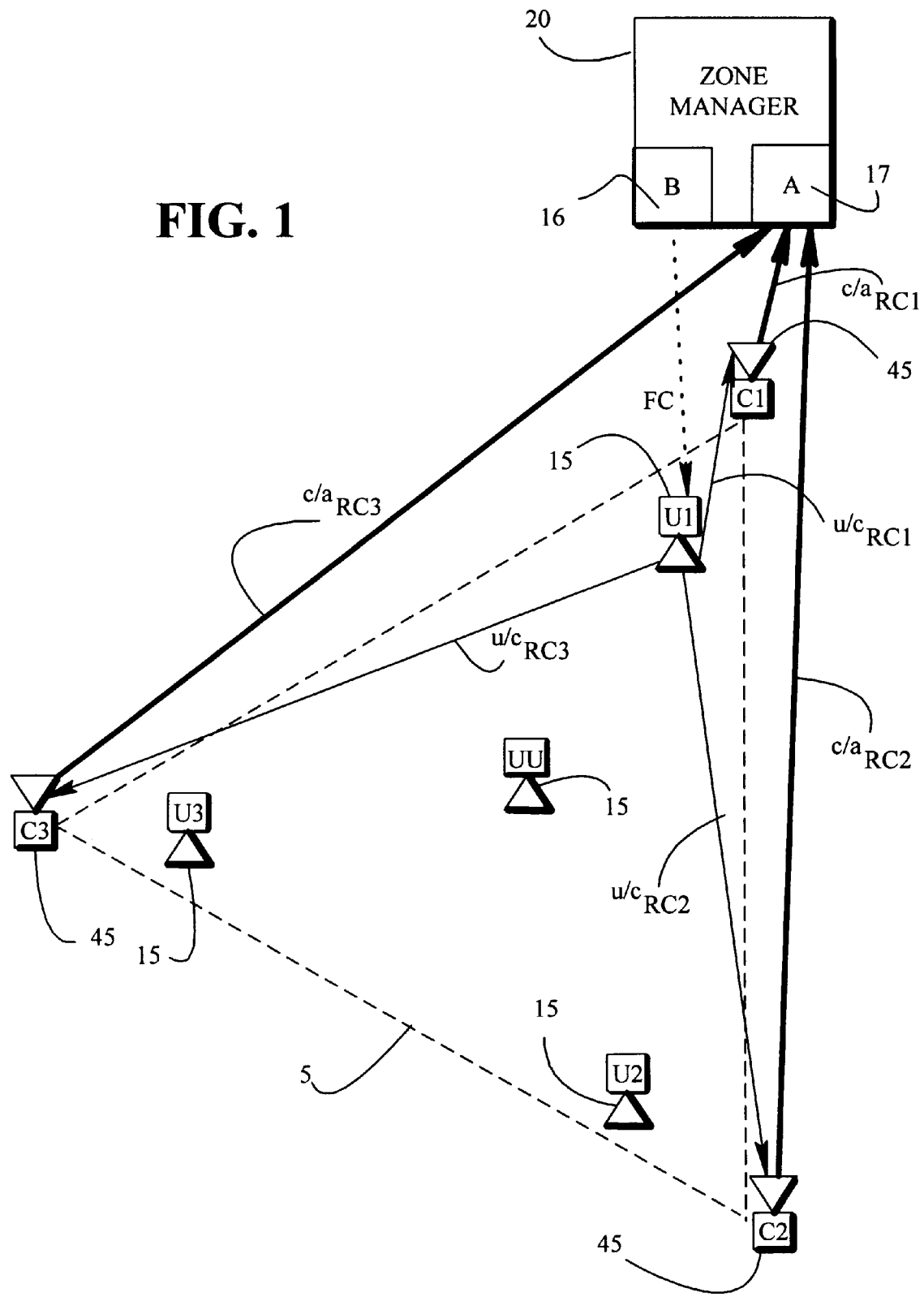
FIG. 1 depicts a communication system for wireless users employing macro-diversity combining, each user transmitting user signals to a plurality of collectors that in turn forward the user signals with processed confidence metrics for each user to an aggregator for combining.

Cellular System—FIG. 1

In FIG. 1, a cellular system is shown having a zone manager 20 that broadcasts forward channel (FC) communications from broadcaster 16 to multiple users 15 including users U1, U2, . . . , UU located within a zone 5 designated by the dashed-line triangle. Each of the multiple users 15 transmits reverse channel (RC) communications to one or more of multiple collectors 45 including collectors C1, C2 and C3, which in turn forward the reverse channel communications to aggregator 17 in zone manager 20.

Each of the users 15 has a receiver antenna for receiving broadcasts on the forward channel from the broadcaster 16. Also, each of the users 15 has a transmitter that transmits on a reverse channel to the collectors 45. The collectors 45 are sited at macro-diverse locations relative to each other within zone 5. Therefore, multiple copies of macro-diverse reverse channel communications are received at the aggregator 17 for each user.

In FIG. 1, the U1 user 15 is typical with forward channel (FC) communication from broadcaster 16, the user-to-collector reverse channel communications (MARC) to each of the C1, C2 and C3 collectors 45, and the collector-to-aggregator reverse channel communications ($^{c/a}$RC) for each of the collectors to aggregator 17. The reverse channel communications from the U1 user 15 include the user-to-collector communication $^{u/c}$RC1 and the collector-to-aggregator communication $^{c/a}$RC1, the user-to-collector communication $^{u/c}$RC2 and the collector-to-aggregator communication $^{c/a}$RC2 and the user-to-collector communication $^{u/c}$RC3 and the collector-to-aggregator communication $^{c/a}$RC3. Each of the other users U2, . . . , UU in FIG. 1 has similar forward and reverse channel communications.

The forward and reverse channel communications of FIG. 1 in the present invention apply to any digital radio signal system including for example TDMA, CDMA, SDMA and FDMA systems. If the digital radio signals of any particular system are not inherently burst structured, then arbitrary burst partitions may be used for confidence metric processing in accordance with the present invention.

Figure 2:
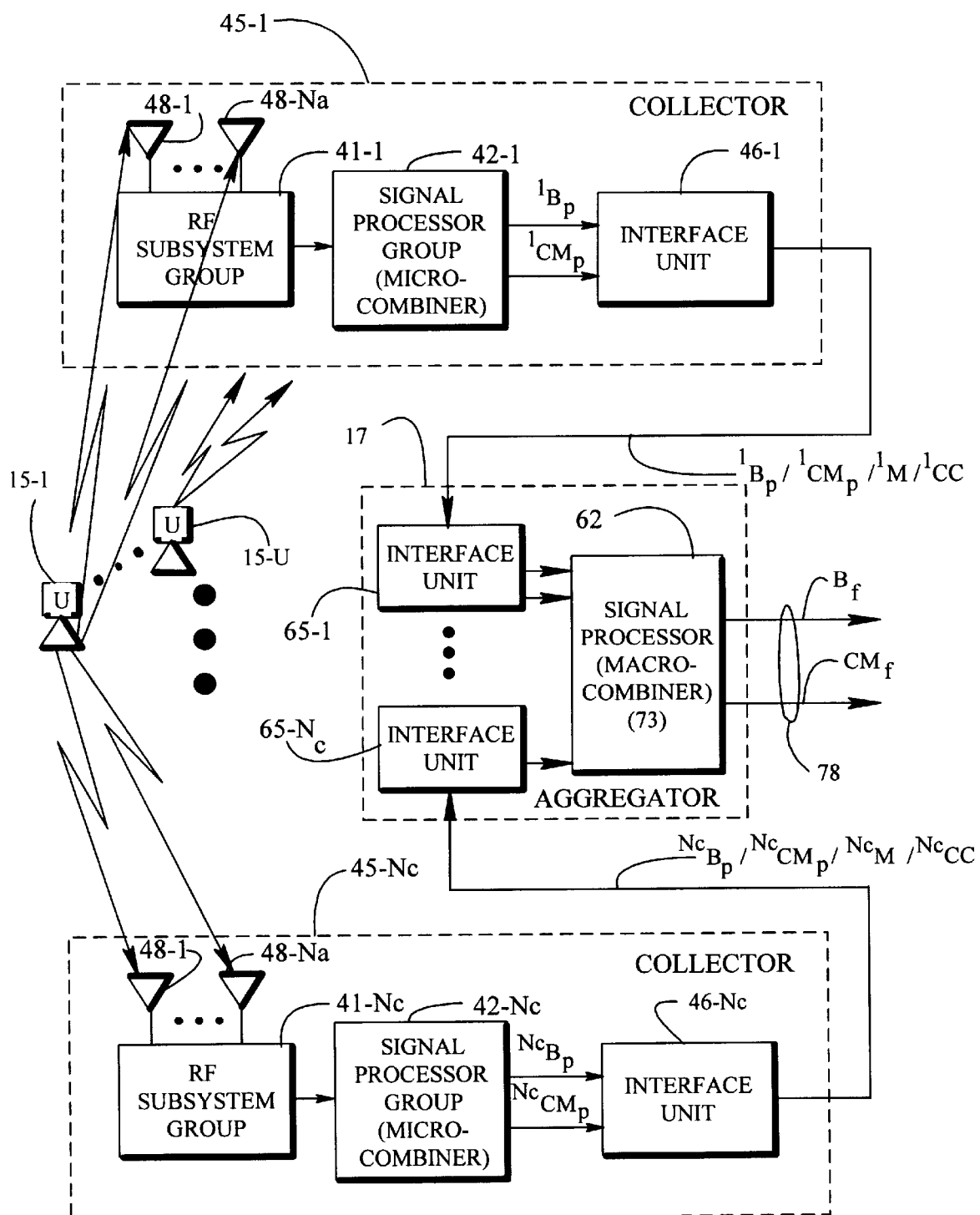
FIG. 2 depicts further details of the users, plurality of collectors and aggregator for the communication system of FIG. 1.

Multiple-Collector Configuration—FIG. 2

In FIG. 2, a plurality of collectors 45-1, . . . , 45-Nc, like the collectors 45 in FIG. 1, each receive reverse channel communications from users 15-1, . . . , 15-U. For each user 15, the collectors 45-1, . . . , 45-Nc each generate data bursts, $^1B_p$, . . . , $^{Nc}B_p$, respectively, and corresponding processed confidence metric vectors $^1CM_p$, . . . , $^{Nc}CM_p$, respectively, all representing the same communication from the user 15. These communications have macro-diversity because of the macro distances separating the collectors 45 of FIG. 1. These communications include spatially macro-diverse data bursts, $^1B_p$, . . . , $^{Nc}B_p$, and corresponding processed confidence metric vectors $^1CM_p$, . . . , $^{Nc}CM_p$ that are forwarded to the aggregator 17 in formatted form designated as $^1B_p/^1CM_p/^1M/^1CC$, . . . , $^{Nc}B_p/^{Nc}CM_p/^{Nc}M/^{Nc}CC$. The aggregator 17 combines the spatially diverse data bursts $^1B_p$, . . . , $^{Nc}B_p$, and corresponding confidence metric vectors $^1CM_p$, . . . , $^{Nc}CM_p$ to form a final single representation of the data burst, $B_f$, with a corresponding final confidence metric vector, $CM_p$. The aggregator 17 may use the measurement signals $^1M, \ldots, ^{Nc}M$ and control signals $^1CC, \ldots ^{Nc}CC$ in selecting or processing the data bursts $^1B_p, \ldots, ^{Nc}B_p$, and/or the corresponding confidence metric vectors $^1CM_p, \ldots, ^{Nc}CM_p$. For example, if a particular burst is associated with a poor quality signal, the particular burst may be excluded from the aggregation. The quality of a signal is measured in one example based on the channel model attenuation estimate.

In FIG. 2, the collectors 45-1, ..., 45-Nc include an RF subsystem groups 41-1, ..., 41-Nc which have two or more micro-diversity receive antennas 48-1, ..., 48-$N_a$. The antennas 48-1, ..., 48-$N_a$ each receives the transmitted signals from each one of a plurality of users 15-1, ..., 15-U. Each representation of a received signal from a single user that is received by the RP subsystem group 41-1, ..., 41-Nc connects in the form of a burst of data to the corresponding signal processor group 42-1, ..., 42-Nc. The received data bursts from the antennas 48-1, ..., 48-$N_a$ are represented as $^1B_r, \ldots, ^{Na}B_r$. The signal processor groups 42-1, ..., 42-Nc processes the plurality of received bursts for a single user to form a single processed bursts, $^1B_p, \ldots, ^{Nc}B_p$, representing the signals from the single user. The processed bursts, $^1B_p, \ldots, ^{Nc}B_p$, have corresponding confidence metric vectors, $^1CM_p, ^2CM_p, \ldots, ^{Nc}CM_p$, representing the reliability of each bit of the data bursts. Each processed burst has the bits $\beta_{p1}, \beta_{p2}, \ldots, \beta_{pB}$ and the processed confidence metric vector, $CM_p$, has the corresponding processed confidence metrics $Cm_{p1}, Cm_{p2}, \ldots, Cm_{pB}$. Measurement signals, $^1M, \ldots, ^{Nc}M$, are formed that measure the power or other characteristics of the signal. The processed bursts, the confidence metric vectors, and the measurements connect to the interface units 46-1, ..., 46-Nc which formats those signals and transmits or otherwise connects them as reverse channel signals to the aggregator 17.

In FIG. 2, the signal processor groups 42-1, ..., 42-Nc receive timing information that permits collector signals from each collector to be time synchronized with signals from each of the other collectors. For example, each collector has a global positioning system (GPS) receiver (not shown) for receiving a time synchronization signal. Alternatively, or in addition, the zone manager 20 of FIG. 1 can broadcast or otherwise transmit time synchronization information. The signal processors 42-1, ..., 42-Nc provide time stamps in collector control signals $^1CC, \ldots, ^{Nc}CC$ that are forwarded from interface units 46-1, ..., 46-Nc as part of the reverse channel signals to the aggregator 17.

Figure 3:
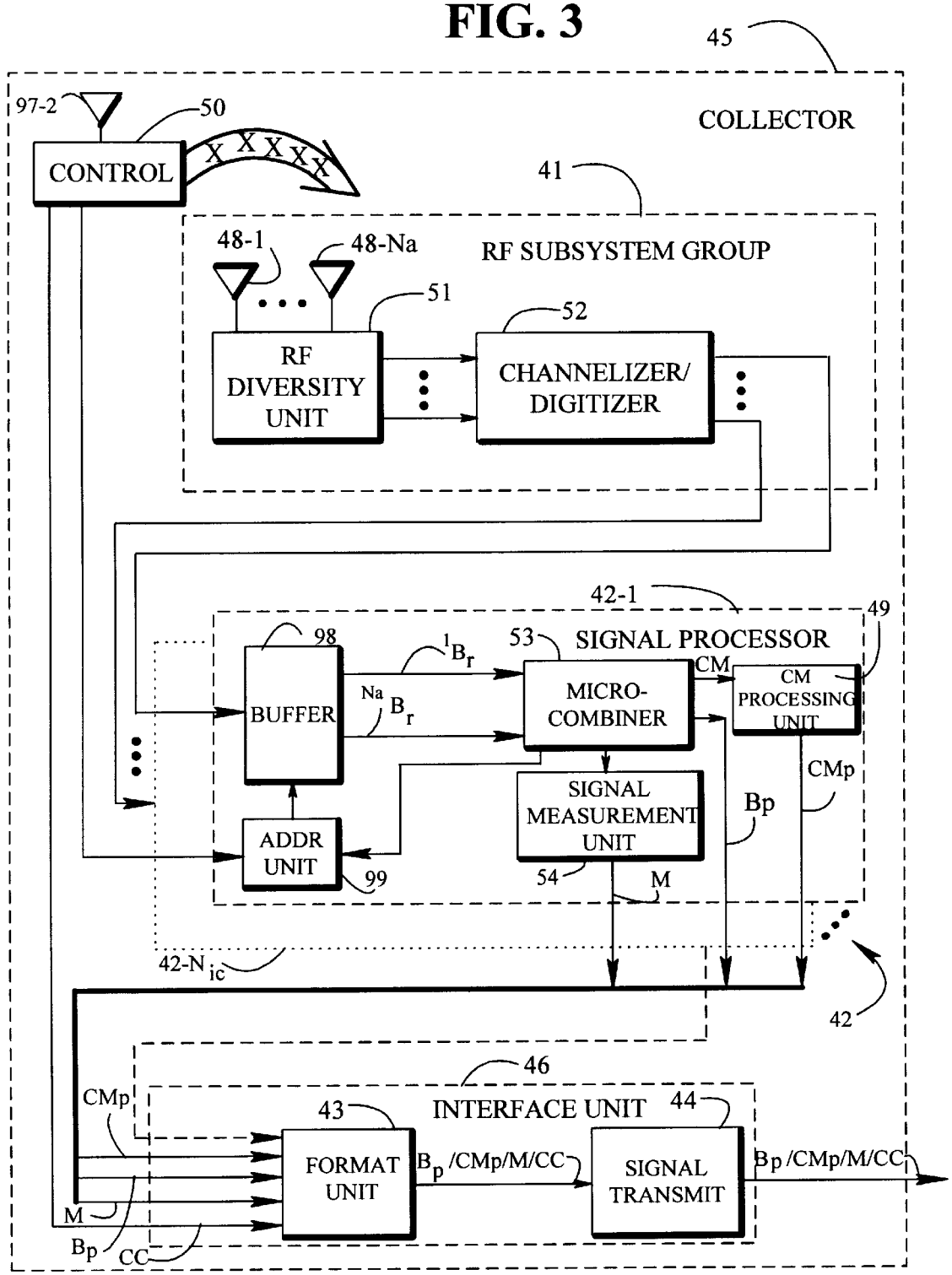
FIG. 3 depicts a block diagram representation of a collector.

Collector—FIG. 3

In FIG. 3, a collector 45 is typical of each of the collectors 45 of FIG. 1 and FIG. 2. In FIG. 3, the collector 45 includes an RF subsystem group 41 which has two or more micro-diversity receive antennas 48-1, ..., 48-$N_a$. The antennas 48-1, ..., 48-$N_a$ each receives the transmitted signals from each one of a plurality of users. Each representation of a received signal from a single user that is received by the RF subsystem group 41 connects in the form of a burst of data to the signal processor group 42. The received bursts of data from the antennas 48-1, ..., 48-$N_a$ are represented as $^1B_r, \ldots, ^{Na}B_r$, respectively, in FIG. 3. The signal processor group 42 processes the plurality of received bursts for a single user to form a single processed burst, $B_p$, representing the signals from the single user. The processed burst, $B_p$, has a confidence metric vector, CM, representing the reliability of each bit of the data comprising the processed burst, $B_p$. Each processed burst has the bits $\beta_{p1}, \beta_{p2}, \ldots, \beta_{pB}$ and the confidence metric vector, CM, has the corresponding confidence metrics $Cm_1, Cm_2, \ldots, Cm_B$. Measurement signals, M, are formed that measure the power or other characteristics of the signal, and control signals, CC, are generated to control the operations. The processed burst, $B_p$, the confidence metric vector, $CM_p$, the measurements, M, and the control, CC, connect to the interface unit 46 which formats those signals and transmits or otherwise connects them as reverse channel signals to the aggregator 17 of zone manager 20 of FIG. 1.

In FIG. 3, the signal processor group 42 receives timing information that permits collector signals from each collector to be time synchronized with signals from each of the other collectors. For example, each collector has a global positioning system (GPS) receiver (not shown) for receiving a time synchronization signal. Alternatively, or in addition, the zone manager 20 or some region manager (not shown) of FIG. 1 can broadcast or otherwise transmit time synchronization information. The time stamp is provided in the control code (CC) signal that is forwarded from interface unit 46 to the aggregator 17 of FIG. 2.

In FIG. 3, the RF subsystem group 41 includes an RF diversity unit 51 that receives signals from users 15 on micro-diversity antennas 48-1, ..., 48-$N_a$ and connects to a channelizer/digitizer 52. The channelizer isolates signals on individual carriers for processing with an output for each of the carriers $N_1, \ldots, N_{ic}$. The digital signals from the channelizer/digitizer 52 for one carrier are input to the signal processor group 42-1 and specifically to a buffer 98. The address unit 99 selects from buffer 98 bursts that correspond to individual users for processing by micro-combiner 53. The micro-combiner 53 outputs processed data bit values in processed burst, $B_p$, and associated confidence metric values in confidence metric vector, $CM_p$. The data and metric values from signal processor 42-1 are connected directly to the format unit 43 in interface unit 46.

In FIG. 3, a plurality of signal processors 42-1, ..., 42-$N_{ic}$, form a signal processor group 42 with one processor for each channel signal from the channelizer/digitizer 52. Each signal processor is like processor 42-1 and provides inputs to interface unit 46. The digital signals from the channelizer/digitizer 52 for a carrier are input to one of the signal processors 42-1, ..., 42-Nic and a corresponding buffer like buffer 98 in signal processsor 42-1. The data and metric values from signal processors 42-1, ..., 42-Nic are all connected directly to the format unit 43 in interface unit 46 for forwarding to an aggregator.

In FIG. 3, the control 50 performs control functions associated with the other units of the collector and in particular, receives the time synchronization signal through antenna 97-2 from some timing source. The control 50 generates a time stamp that is inserted at times into the control code (CC) field by the interface unit 43 so that each one or more bursts has a time stamp in a collector that is used at the aggregator to time correlate the same bursts from the same user that are processed at different collectors.

In FIG. 3, the address unit 99 controls the writing of the signals into buffer 98 and the reading of the signals from buffer 98. The address unit 99 is synchronized by coarse timing information from control 50 and by fine timing information from micro-combiner 53.

Further, a signal measurement unit 54 receives signals from the combiner 53 to form power or other measurements on the received bursts or on the processed signals from the combiner 53 to form a measurement signal, M, that inputs to interface unit 46.

The format unit 43 changes the format of the data and metric values from the signal processor group 42 to form signal, $B_p/CM_p/M/CC$, and the format unit 43 connects to the signal transmit unit 44. The transmit unit 44 of collector 45 transmits or otherwise connects the reverse channel user information, $B_p/CM_p/M/CC$, to the aggregator 17. The transmission medium between the collector 45 and the aggregator 17 can be land lines, such as wire or optical fiber, or can be RF transmission using either in-band or out-of-band RF transmission signals. If the collector 45 is located at the aggregator 17, then a local bus or other direct connection not requiring transmission is employed.

In FIG. 3, the micro-combiner 53 operates with each of the received data bursts $^1B_r, \ldots, ^{Na}B_r$ to form the processed data burst, $B_p$, and a corresponding confidence metric vector, CM. The combining of confidence metrics from micro-diverse antennas at a collector to produce processed bits of a processed data burst, $B_p$, and corresponding confidence metrics may be accomplished in one embodiment by an integrated multisensor equalization process. In another embodiment, the signals from separate antennas may be equalized individually and then combined by averaging or other processing of the equalizer confidence metrics.

The processed data burst, $B_p$, includes the processed burst bit values $\beta_{p1}, \beta_{p2}, \beta_{pB}$ and the resultant confidence metric vector, CM, includes the corresponding confidence metrics $Cm_1, Cm_2, \ldots, Cm_B$ where B in the subscript is the number of bits in the burst and the number of corresponding confidence metrics, one confidence metric for each bit.

The confidence metric, $Cm_b$, is in the form of a number. A large positive confidence metric value indicates a high confidence that the data bit is a binary 1. A large negative confidence metric value indicates a high confidence that the data bit is a binary 0.

Figure 4:
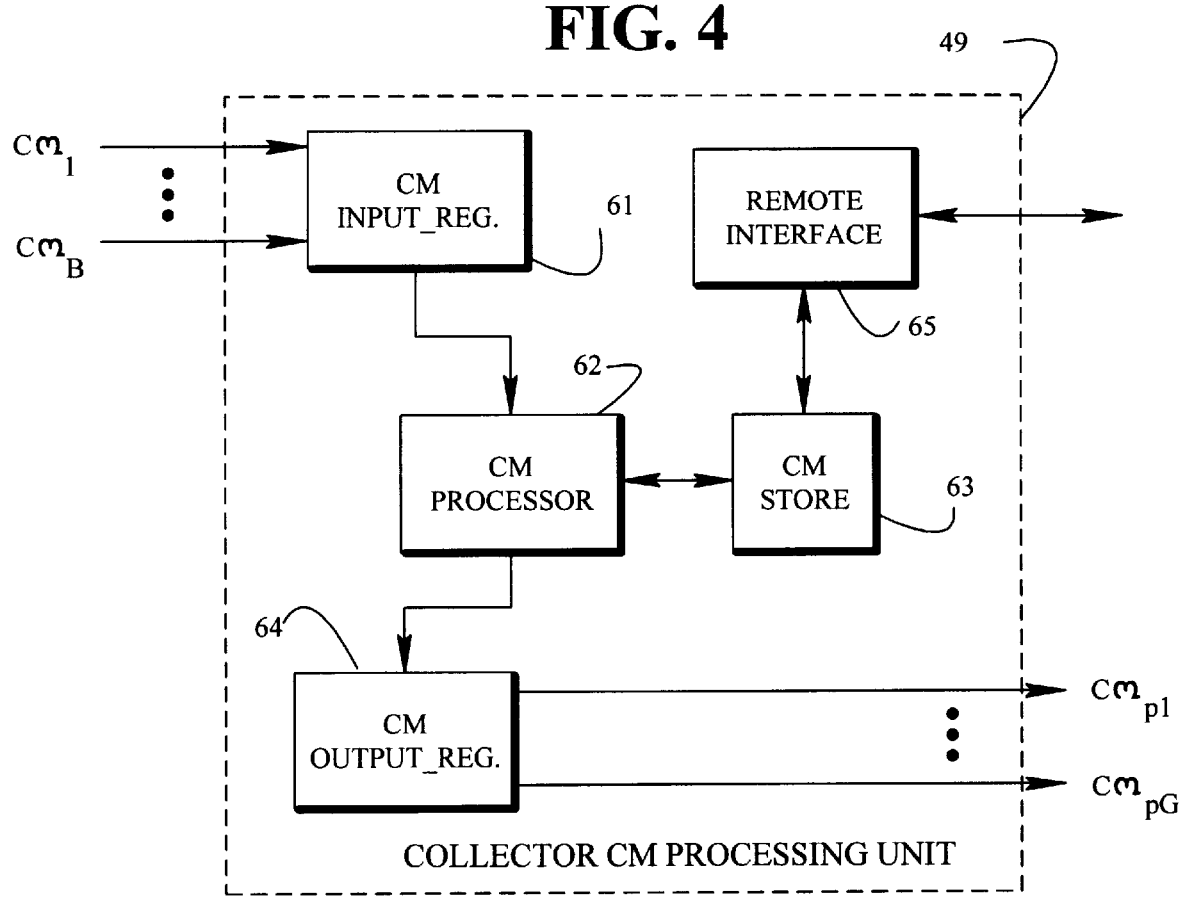
FIG. 4 depicts a block diagram representation of a collector processing unit for processing of confidence metrics.
Figure 5:
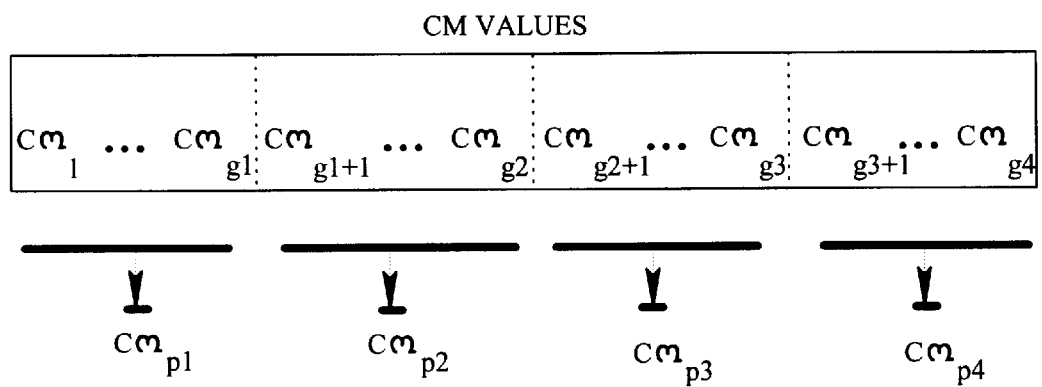
FIG. 5 depicts a block diagram representation of compression of confidence metrics.

Collector Confidence Metric Processing Unit—FIG. 4 And FIG. 5

In FIG. 4, the Collector Confidence Metric Processing unit 49 of FIG. 3 is shown in further detail. The confidence metric vectors for a series of bursts are input one at a time to the CM input register 61. Each confidence metric vector, CM, includes the confidence metrics $Cm_1, Cm_{21}, \ldots, Cm_b, \ldots, Cm_B$, one for each of the B data bits, $\beta_{p1}, \beta_{p2}, \ldots, \beta_{pb}, \ldots, \beta_{pB}$ in a data burst.

Each of the confidence metrics such as typical confidence metric, $Cm_b$, corresponding to a data bit, $\beta_{pb}$, is in the form of an signed number, $s_b c_b$, where $_b$ is the sign having a $-1$ or $+1$ value and $c_b$ is the amplitude where $0 < c_b << a$ and the amplitude a indicates the range for $c_b$. Therefore, each confidence metric, $Cm_b$, is represented by a signed number value, $s_b c_b$, where $(-a) < s_b c_b < (+a)$. For $\gamma$ equal to the number of bits in the amplitude of the confidence metric, $a=2^\gamma$. A large positive confidence metric value, $+c_b$, indicates a high confidence that $Cm_b$ is a binary 1. A large negative confidence value for $-c_b$ indicates a high confidence that $Cm_b$ is a binary 0. More generally, the confidence metrics, $Cm_1, Cm_2, \ldots, Cm_b, \ldots, Cm_B$ are represented by the signed numbers $s_1 c_1, s_2 c_2, \ldots, s_b c_b, \ldots, s_B c_B$ for the B bits in a data burst.

In one embodiment described, the logical 1 and logical 0 values of the data bits, $\beta_{p1}, \beta_{p2}, \ldots, \beta_{pb}, \ldots, \beta_{pB}$, in a data burst represent the signs $s_1, s_2, \ldots, s_b, \ldots, s_B$ where a 1 for a data bit is positive and a 0 for a data bit is negative. Only the data bits, $\beta_{p1}, \beta_{p2}, \ldots, \beta_{pb}, \ldots, \beta_{pB}$ and confidence metrics are actually transmitted from the collectors to the aggregator. At the aggregator, the data bits, $\beta_1, \beta_{p2}, \ldots, \beta_{pb}, \ldots, \beta_{pB}$ are mapped to the signs $s_1, s_2, \ldots, s_b, \ldots, s_B$ where a 1 for a data bit is a positive sign and a 0 for a data bit is a negative sign as follows:

$$\beta = 0 \Rightarrow s_b = -1 \quad \text{Eq. (1)}$$
$$\beta = 1 \Rightarrow s_b = +1$$

In FIG. 4, the CM processor 62 operates with a number of different algorithms to process the initial confidence metrics to form processed confidence metrics. For example, the processing includes grouping of confidence metrics, scaling and quantizing of confidence metrics together with static and dynamic control of the processing.

In FIG. 4, the CM processor 62 in one grouping embodiment processes the confidence metrics in groups and, for each group, provides one or more processed confidence metrics. The initial confidence metrics $Cm_1, Cm_2, \ldots, Cm_b, \ldots, Cm_B$ for one data burst are divided into G groups that include the groups $G1, G2, \ldots, GG$ that in turn include the confidence metrics $Cm_1, \ldots, Cm_{g1}$ for group G1; $Cm_{(g1+1)}, \ldots, Cm_{g2}, \ldots, Cm_{(gG-1)+1}, \ldots, Cm_{gG}$ for group GG. Each of the confidence metrics in the first group, $Cm_1, \ldots, Cm_{g1}$, is combined to form a single processed confidence metric $Cm_{p1}$. Similarly, the other groups are processed to form the processed confidence metrics $Cm_{p1}, Cm_{p2}, \ldots, Cm_{pi}, \ldots, Cm_{Pg}$.

By way of example, and referring to FIG. 5, the confidence metrics $Cm_1, Cm_2, \ldots, Cm_b, \ldots, Cm_B$ for one burst are divided into four groups. The four groups G1, G2, G3 and G4 include the confidence metrics $Cm_1, \ldots, Cm_{g1}$ for group G1; $Cm_{(g1+1)}, \ldots, Cm_{g2}$ for group G2; $Cm_{(g2+1)} \ldots, Cm_{g3}$ for group G3; and $Cm_{(g3+1)}, \ldots, Cm_{g4}$ for group G4. Each of the confidence metrics in the first group, $Cm_1, \ldots, Cm_{g1}$, is combined to form a single processed confidence metric $Cm_{p1}$. Similarly, the four groups are processed to form the four processed confidence metrics $Cm_{p1}, Cm_{p2}, Cm_{p3}, Cm_{p4}$. The processing for each group is achieved in one embodiment by averaging the confidence metrics in a group.

The processed confidence metric for the $i^{th}$ group, $cm_{pi}$, is given by the average as follows:

$$cm_{pi} = \frac{\sum_{k=g(i)+1}^{k=g(i+1)} cm_k}{g(i+1) - g(i)} \quad \text{Eq. (2)}$$

where,
$Cm_k = k^{th}$ initial confidence metric
$Cm_{pi}$=processed confidence metric for the $i^{th}$ group
$g(i)+1$=beginning confidence metric in group
$g(i+1)$=ending confidence metric in group
$g(i+1)-g(i)$=number of confidence metrics in group
By way of example and referring to FIG. 5 for group G1 with g(1) equal to 4, Eq. (2) becomes:

$$cm_{pi} = \frac{cm_1 + cm_2 + cm_3 + cm_4}{4} \quad \text{Eq. (3)}$$

In the four-group example described, the processing of four groups causes four processed confidence metrics to replace all (for example, 116 in a GSM embodiment) of the initial confidence metrics. In FIG. 4, the input to register 61 is the initial confidence metrics $Cm_1, Cm_2, \ldots, Cm_b, \ldots, Cm_B$ and the output, after processing in the collector CM processor 62, is the processed confidence metrics $Cm_{p1}, Cm_{p2}, \ldots, Cm_{pG}$ stored in the CM output register 64. In the example where the number of groups, G, is four, the four processed confidence metrics are $cm_{p1}, Cm_{p2}, Cm_{p3}$ and $Cm_{p4}$.

Other grouping embodiments process confidence metrics by using a median confidence metric or some No percentile confidence metric to represent two or more of the initial confidence metrics. The combining of groups of confidence metrics substantially reduces the amount of data required to represent confidence metrics and hence reduces the amount of reverse channel information which is propagated and thereby conserves reverse channel bandwidth.

In FIG. 4, the CM store 63 stores control code and information for the algorithms used to combine the confidence metrics from the input register 61 to form the processed confidence metrics in the output register 64. In one example described, store 63 determines that the input metrics will be divided into four groups and causes each group to be averaged to form one processed confidence metric per group. Other control algorithms are stored in the CM store 63. For example, the number of confidence metrics in each group, the group boundaries (overlapping or non-overlapping) and the number of bits per processed confidence metric can be selected. The combining process is controllable to use algorithms other than averaging (for example using a median confidence metric or some $N^{th}$ percentile confidence metric) and the combining process is controllable to apply one algorithm at one time and another algorithm at another time. The store 63 is static in one embodiment and in other embodiments is modified from time to time with information over the remote interface 65.

In some embodiments of the present invention, the confidence metrics are scaled and quantized so that each one can be represented by a small number of bits, typically 2 to 4, to conserve transmission bandwidth. Such quantization of the initial confidence metrics tends to have only a minimal adverse impact on the final signals output from the aggregator 17 of FIG. 2 if three or more bits are used. By way of comparison, grouping of initial confidence metrics into grouped confidence metrics tends to have a greater adverse impact on the final signals output from the aggregator 17 of FIG. 2 when the group sizes are one-half or one-quarter of the total number of initial confidence metrics.

A simple quantization scheme is linear quantization, where the range of confidence metrics is divided into $2^\gamma$ equal-sized bins, and values in each bin are represented by a γ-bit value. In FIG. 4, each of the initial confidence metrics, $Cm_1, Cm_2, \ldots, Cm_i, \ldots, Cm_B$ has an initial range, $a_{in}$, represented by an initial number of metric bits, $\gamma_{in}$, and the collector confidence metric processing unit processes the initial confidence metrics to form processed confidence metrics, $Cm_{p1}, Cm_{p2}, \ldots, Cm_{pG}$, each having a processed range, ap, represented by a processed number of metric bits, $\gamma_p$, where the processed number of metric bits, $\gamma_p$, is typically less than the initial number of metric bits, $\gamma_{in}$.

Assuming that confidence metrics are processed in unsigned form (since the sign information is present in the corresponding data bit values that are also transmitted to the aggregator) the following formula can be used to perform linear quantization of the confidence metrics:

$$Cm_{pi} = FLOOR\left[\left[\frac{Cm_i}{\max\_Cm\_\text{value} + \epsilon}\right][2^\gamma]\right] \quad \text{Eq. (4)}$$

where:

$Cm_{pi}$=processed confidence metric as quantized value of $Cm_i$ max_Cm_value=maximum value of $Cm_i$ i=1, 2, . . . , B ε=small positive value chosen so that the division always produces a number less than 1.

The floor function maps its argument to the nearest integer less than or equal to the argument. For example, if the maximum confidence metric possible from the micro combiner is 100, and the desired number of bits per transmitted confidence metric is 3, the formula is $$Cm_{pi} = FLOOR\left[\left[\frac{Cm_i}{100 + 1}\right][2^3]\right] \quad \text{Eq. (5)}$$

Various examples of confidence metric processing using different groupings and quantizations are listed in TABLE 1. In TABLE 1, $a_{in}$ represents the range of each of the input confidence metrics, $Cm_i$, where i=1, . . . B, $\gamma_{in}$ represents the number of binary bits used to represent $a_{in}$, $a_p$ represents the range of each of the output confidence metrics, $Cm_{pj}$, where j=1, . . . , G, $\gamma_p$ represents the number of binary bits used to represent $a_p$, G represents the number of groups per burst (assuming 116 data bits per burst as is the case in a GSM embodiment), $BITS_G$ represents the number of bits per group, and $TOT_{cm}$ represents the total number of bits per burst used for the confidence metrics of a confidence metric vector for a burst.

TABLE 1

| Example | $a_{in}$ | $\gamma_{in}$ | $a_p$ | $\gamma_p$ | G | $BITS_G$ | $TOT_{CM}$ |
|---|---|---|---|---|---|---|---|
| 1 | 200 | 8 | 200 | 8 | 116 | 1 | 928 |
| 2 | 200 | 8 | 7 | 3 | 116 | 1 | 348 |
| 3 | 200 | 8 | 200 | 8 | 4 | 29 | 32 |
| 4 | 200 | 8 | 200 | 8 | 2 | 58 | 16 |
| 5 | 200 | 8 | 7 | 3 | 4 | 29 | 12 |

In TABLE 1, Example 1 is the initial unprocessed confidence metric, Examples 2 and 5 employ quantization as set forth in Eq. (4) and Eq. (5) above and Examples 3, 4 and 5 employ grouping. Note that Example 5 employs a combination of both grouping and quantization.

The relationship between the performance of confidence metric processing as determined by the quality of the final signals output from the aggregator 17 of FIG. 2 and the total number of bits per burst, $TOT_{CM}$, depends on a number of factors. When the quality of the received signals is high, then the quality of the final signals output from the aggregator 17 tends to be high even when the total number of bits per burst is low. When the quality of the received signals is low, then the quality of the final signals output from the aggregator 17 tends to be higher when the total number of bits per burst is higher. The total number of bits per burst allocated to confidence metrics affects the capacity of the system as well as the quality of the signals. Higher numbers of bits allocated for confidence metrics reduces the number of bits available for other purposes such as for increased numbers of users in the system. In light of this trade off between quality and capacity, the performance of the system is enhanced if more confidence metric bits are allocated to improving poorer quality initial signals where the improvement is needed than are allocated to improving higher quality initial signals where the improvement is not needed.

Aggregator—FIG. 6 and FIG. 7

In FIG. 6, a block diagram representation of the aggregator 17 is shown. The aggregator 17 includes a receive/format group 66 which operates to receive and format signals transmitted by the signal transmit unit 44 of collectors 45 of FIG. 3. The received signals $^1B_p/^1CM_p/^1M/^1CC$, $^2B_p/^2CM_p/^2M/^2CC, \ldots, ^{Nc}B_p/^{Nc}Cm_p/^{Nc}M/^{Nc}CC$, after formatting are connected to the signal processor 67 which processes the received signals for macro-diversity combining. The format group 66 uses the time stamp and other control code (CC) information to align the signals from different collectors for the same user. More specifically, the format unit 66 for each one or more bursts compares and aligns the time stamps from the control fields $^1CC, ^2CC, \ldots, ^{N_c}CC$ so that the corresponding data, confidence metric and measurement signals from different collectors, for the same common burst from a user are aligned.

In FIG. 7, further details of the signal processor 67 for the aggregator 17 are shown. The signal processor 67 of FIG. 7 is a representation of the processing of burst signals from a single one of the users, for example user 15-1 of FIG. 2 and the $N_c$ representations of the reverse channel signal from the user as received through the $N_c$ active collectors, such as the collectors 45-1, 45-2, ..., 45-$N_c$ in FIG. 2.

In FIG. 7, the $N_c$ data, metric and measurement values at 96 for a single user include the data and processed confidence metric pairs $[^1B_b, ^1CM], [^2B_b, ^2CM_p], \ldots, [^{N_c}B_b, ^{N_c}CM_p]$ and the measurement values, $^1M, ^2M, \ldots, ^{N_c}M$. The processed confidence metrics, $^1CM_p, ^2CM_p, \ldots, ^{N_c}CM_p$ are processed in the aggregator CM processing units 70-1, 70-2, ..., 70-Nc, respectively, to form the aggregator processed confidence metrics, $^1CM_{pp}, ^2CM_{pp}, \ldots, ^{N_c}CM_{pp}$. The aggregator processed confidence metrics, $^1CM_{pp}, ^2CM_{pp}, \ldots, ^{N_c}CM_{pp}$ together with the data bits, $^1B_b, ^2B_b, \ldots, ^{N_c}B_b$, at 87 are input to the input selector 93 wich selects one or more aggregator processed confidence metrics and corresponding data bits for each of the combiner unit groups 99 including combiner unit groups 99-1, ..., 99-$N_g$. The selected aggregator processed confidence metrics, $^1CM_{pp}, ^2CM_{pp}, \ldots, ^{N_c}CM_{pp}$ together with the corresponding selected data bits of bursts $^1B_b, ^2B_b, \ldots, ^{N_c}B_b$, are input at 88 to macro-diversity combiners like macro-diversity combiner 73 in combiner unit 99-1.

The combiner unit group 99-1 is typical of the combiner unit groups 99-1, ..., 99-$N_g$ and includes the macro-diversity combiner 73, de-interleaver 74, de-convolution unit 75 and block decoder 85. The data and metric values from the combiner 73 are de-interleaved in the de-interleaver 74 and de-convolved (that is, the convolutional coding is removed) in de-convolution unit 75. The data and metric outputs from the de-convolution unit 75 connect to the block decoder unit 85 to form the output pair 78-1. Specifically, the combiner unit groups 99-1, ... 99-Ng provide the output pairs 78-1, ..., 78-Ng that are input to the output selector 95. The output selector 95 selects one of the output pairs 78-1, ..., 78-Ng as the final output pair 78 that connects to communications network 76 and, ultimately, after connection through the network, to a speech decoder 77 to re-establish a user voice signal that corresponds to the user voice signal that was input to the transceiver of the user 15 in FIG. 2.

The FIG. 7 signal processor 67 includes a measurement processor 91 that receives the measurement signals $^1M, ^2M, \ldots, ^{N_c}M$ and processes them to determine which ones or all of the data and metric values are actually used in the macro-diversity combiners 73 in each of the combiner unit groups 99. As one example, the measurement signals are measures of the power of the received bursts and any burst that has a power level that is below a threshold is not selected for further processing. The selector 93 selects different ones of the data and metric input pairs as inputs to the macro-diversity combiners 73. The FIG. 7 signal processor 67 in a simple embodiment does not use the measurement signals $^1M, ^2M, \ldots, ^{N_c}M$.

In FIG. 7 and in one embodiment, the measurement processor 91 provides weighting factors $^1w_b, ^2w_b, \ldots, ^aw_b, \ldots, ^{N_c}w_b$ corresponding to the data bits $^1\beta_p, ^2\beta_p, \ldots, ^{N_c}\beta_p$ of a burst. The weighting factors are used, for example, to weight the combination of bit values based upon a measurement parameter from measurement processor 91.

The data and metric values from the combiners 73 are de-interleaved in the de-interleavers 74 and de-convolved in de-convolution units 75, respectively. The data and metric outputs from the de-convolution units 75 connect to the block decoders 85, respectively, which in turn connect to the output selector 95. The output selector 95 operates, for example, on frame erasure signals from the block decoders 85 which are input to the erasure select control 94. The erasure select control 94 may inhibit any of the outputs 78-1, ..., 78-Ng from block decoders 85 from being selected as the output 78 when a frame erasure signal is present. When more than one of the outputs is available without a frame erasure signal, the one selected is the one corresponding to a particular measurement signal from measurement processor 91. For example, one having the highest power level is selected. The block decoders 85 connect through output selector 95 to the communications network 76 and ultimately after connection through the network to a vocoder 77, to re-establish a voice signal that corresponds to the user voice signal that was input to the user transceiver.

Figure 8:
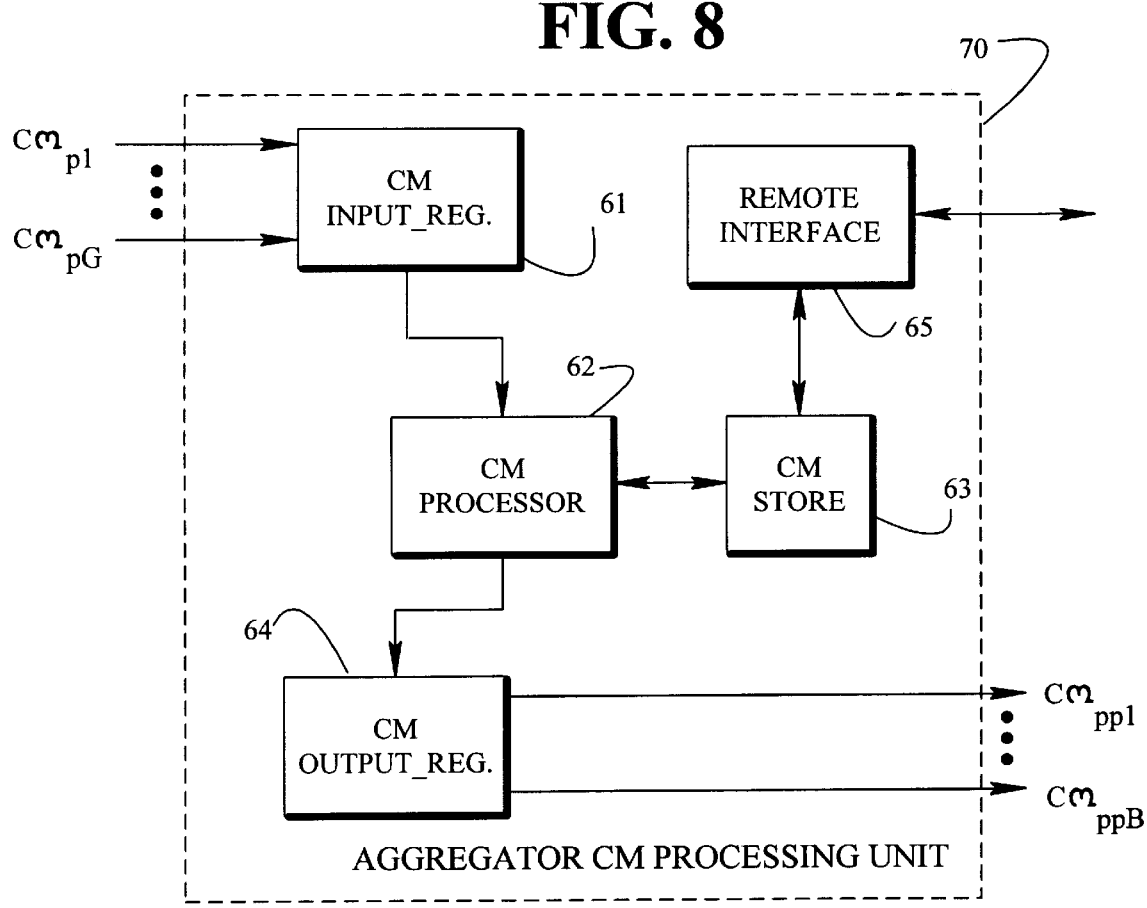
FIG. 8 depicts a block diagram representation of an aggregator processing unit for processing of confidence metrics.
Figure 9:
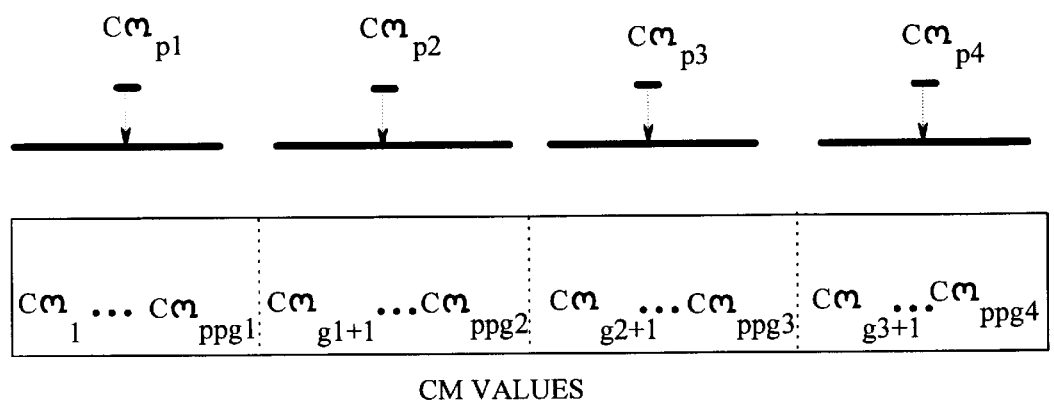
FIG. 9 depicts a block diagram representation of uncompression of compressed confidence metrics.

Aggregator Confidence Metric Processing Unit—FIG. 8 And FIG. 9

In FIG. 8, the aggregator CM processing unit 70 is typical of the CM processing units 70-1, 70-2, ..., 70-$N_c$ of FIG. 7. The processed confidence metric vectors $^1CM_p, \ldots, ^cCM_p, \ldots, ^{N_c}CM_p$ are input one at a time to the CM input register 61. Each processed confidence metric vector, $^cCM_p$, includes as an input the processed confidence metrics $^ccm_{p1}, \ldots, ^ccm_{pG}$ and produces as an output the output confidence metrics $^ccm_{pp1}, \ldots, ^ccm_{ppG}$. The type of processing performed in the aggregator CM processing unit of FIG. 8 complements the type of processing performed in the collector CM processing unit of FIG. 4. Specifically, when the confidence metrics have been grouped in the collector CM processing unit of FIG. 4, the aggregator CM processing unit of FIG. 8 ungroups the confidence metrics.

In FIG. 8, the CM processor 62 in a grouped confidence metric embodiment operates for each grouped confidence metric to provide ungrouped confidence metrics, one for each data bit. By way of the FIG. 5 example, and referring to FIG. 5, the initial confidence metrics $^ccm_1, ^ccm_2, \ldots, ^ccm_b, \ldots, ^ccm_B$ for one burst were divided into four groups. In FIG. 8 the grouped confidence metric $^ccm_{p1}$, is processed to provide the aggregator output confidence metrics $^ccm_1, \ldots, ^ccm_{g1}$ for group G1; the grouped confidence metric $^ccm_{p2}$ is processed to provide the aggregator output confidence metrics $^ccm_{(g1+1)} \ldots, ^ccm_{(g2)}$ for group G2, the grouped confidence metric $^ccm_{p3}$ is processed to provide the aggregator output confidence metric $^ccm_{(g2+1)}, \ldots, ^ccm_{g3}$ for group G3; and the grouped confidence metrics $^ccm_{p4}$ is processed to provide the aggregator output confidence metrics $^ccm_{(g3+1)}, \ldots, ^ccm_{g4}$ for group G4. The processing for each grouped confidence metric in the aggregator is achieved, in one embodiment, by setting each of a plurality of aggregator output confidence metrics equal to the grouped confidence metric value for its corresponding group.

In FIG. 8 for the FIG. 9 example, the input to register 61 for each of the 1, ..., $N_c$ collectors is the grouped confidence metrics $Cm_{p1}$, $Cm_{p2}$, $Cm_{p3}$ and $Cm_{p4}$ and the output, after processing in the CM processor 62, is the aggregator output confidence metrics $^ccm_1$, $^ccm_2$, ..., $^ccm_b$, ..., $^ccm_B$ stored in the register 64. The aggregator output confidence metrics, $^ccm_{(g1+1)}$, $^ccm_2$, ..., $^ccm_b$, ..., $^ccm_B$, are not a one-for-one reconstitution of the initial confidence metrics, $Cm_1$, $Cm_2$, ..., $Cm_b$, ..., $Cm_B$, since the confidence metric processing may be lossy in that some information is lost. Notwithstanding the lossy processing, overall system operation is enhanced by allowing flexibility in trade-offs between quality, bandwidth and capacity.

In FIG. 8, the CM store 63 stores control code and information for the algorithms used to process the grouped confidence metrics from the CM input register 61 to form the confidence metrics in the CM output register 64. In the example described, store 63 determines that the input of the metrics has been divided into four groups and causes each confidence metric of a group to be equal to the average determined in the CM processing unit 49 of FIG. 4. Other control algorithms are stored in the CM store 63 of FIG. 8 to match the operation of the collector CM processing unit of FIG. 4.

Combining Processed Confidence Metrics

The aggregator 17 of FIG. 6 receives a plurality of bursts $^1B_p$, ..., $B_p$, ..., $^{Nc}B_p$, representing the reverse channel signals for the same particular one of the users 15 and combines them based on quality metrics. Each burst such as typical burst, $^1B_p$, includes data bits $\beta_{p1}$, $\beta_{p2}$, ..., $\beta_{pb}$, ..., $\beta_{pB}$, and a confidence metric vector, CM, having confidence metrics, $Cm_1$, $Cm_2$, ..., $Cm_b$, ..., $Cm_B$. The confidence metrics, $Cm_1$, $Cm_2$, ..., $Cm_b$, ..., $Cm_B$ are represented by the signed numbers $s_1c_1$, $s_2c_2$, ..., $s_bc_b$, ..., $s_Bc_B$. In the embodiment described, the logical 1 and logical 0 values of the data bits, $\beta_{p1}$, $\beta_{p2}$, ..., $\beta_{pb}$, ..., $\beta_{pB}$, in the data burst represent signs $s_1$, $s_2$, ..., $s_b$, ..., $s_B$ of the confidence metrics where a 1 for a data bit is positive sign and a 0 for a data bit is a negative sign.

In an embodiment where $N_c$ representations, $^1\beta_{pb}$, $^2\beta_{pb}$, ..., $^{Nc}\beta_{pb}$, of each bit such as typical bit, $\beta_{pb}$, are generated with Nc confidence metrics, $^1Cm_b$, $^2Cm_b$, ..., $^\alpha Cm_b$, ..., $^{Nc}Cm_b$ for each bit, each measured by numbers $^1c_b$, $^2c_b$, ..., $^\alpha c_b$, ..., $^{Nc}c_b$, respectively, with each number $^\alpha c_b$ ranging between 0 and +a and where $^\alpha s_b$ is the sign, the average aggregate confidence metric, $^{agg}c_b$ for each bit b is as follows:

$$^{agg}c_b = \frac{1}{N_c}\sum_{\alpha=1}^{N_c} {}^\alpha s_b({}^\alpha c_b + 1) \qquad \text{Eq. (6)}$$

In an example where the number of collectors $N_c$ is equal to 3, the calculations for a single one of the bits b is as follows:

$$cm_{pi} = FLOOR\left[\left[\frac{cm_i}{\max\_cm\_\text{value} + \epsilon}\right][2^\gamma]\right]$$

The Eq. (4) confidence metric combining is useful where soft decision information is available for each bit of data. One embodiment for generating the initial soft decision information in the form of initial confidence metrics uses micro-diversity processing at collectors having two or more spatially diverse antennas 48-1, ..., 48-Na as described in connection with FIG. 2.

Referring to the collectors of FIG. 3, for example, macro-diversity is achieved with the spatially macro-diverse collectors 45-1, ..., 45-Nc where in an example if $N_c$=3, the collectors are 45-1, 45-2 and 45-3 (45-2 and 45-3 are not explicitly shown in FIG. 2). A numerical example is as follows:

$$^{agg}c_b = \frac{1}{3}({}^1s_b({}^1c_b + 1) + {}^2s_b({}^2c_b + 1) + {}^3s_b({}^3c_b + 1)) \qquad \text{Eq. (7)}$$

The FLOOR function is applied to the values of Eq. (8) and these values are then forwarded from the collector to the aggregator. At the aggregator, the data bits $^1\beta_b$, $^2\beta_b$ and $^3\beta_b$ having values 0, 0 and 1, respectively, are mapped to the signs $^1s_b$, $^2s_b$ and $^3s_b$ having values −1, −1 and +1, respectively, and then Eq. (7) becomes:

$$^{agg}c_b = \frac{1}{3}((-1)(103+1) + (-1)(56+1) + (+1)(166+1)) = 2 \qquad \text{Eq. (9)}$$

In this example, although the magnitude of the negative values for confidence metrics $^1c_b$ (−103) for the path 1 (from a collector 45-1 of FIG. 2) and $^2c_b$ (−56) for path 2 (from a collector 45-2 not explicitly shown in FIG. 2) indicate a 0 bit, the positive value of confidence metric $^3c_b$ for path 3 (from a collector 45-3 not explicitly shown in FIG. 2) indicates a 1 bit with a magnitude that is large enough to outweigh the negative magnitudes for confidence metrics $^1c_b$ and $^2c_b$.

For the case where micro-diversity equalization occurs at the collectors and aggregation occurs at an aggregator (where the aggregator is remotely located at a BTS, for example), the number of confidence metrics and the precision (range) of those metrics is limited in order to conserve bandwidth. Where the back haul design only allocates a few bits for transmitting confidence metrics, the number of bits in the initially formed confidence metrics at the collectors needs to be reduced. For example, if 3-bit integers are allocated for transmitting confidence metrics, then the range, a, of values transmitted is from 0 to 7 (or 1 to 8) where γ indicates the size in bits of the metric and the range, a, is $2^\gamma$.

Let $c_p$ be the magnitude of the processed confidence metric derived from processing the initial confidence metric, $c_{in}$, represented by a γ-bit integer. Then the following algorithm is used to reduce the number of confidence metric bits required:

$$c_p = FLOOR\left[r\frac{c_{in}}{a}\right] \qquad \text{Eq. (10)}$$

From the previous example with a=200, Eq. (10) becomes for each path $$^1c_p = FLOOR\left[8\frac{103.33}{200}\right] = 4, ({}^1\beta_b = 0) \qquad \text{Eq. (11)}$$

$$^2c_p = FLOOR\left[8\frac{56.67}{200}\right] = 2, ({}^2\beta_b = 0)$$

$$^3c_p = FLOOR\left[8\frac{166.67}{200}\right] = 6, ({}^3\beta_b = 1)$$

The values of Eq. (11) are transmitted from the collectors to the aggregator. At the aggregator, the data bits $^1\beta_b$, $^2\beta_b$ and $^3\beta_b$ having values 0, 0 and 1, respectively, are mapped to the signs $^1s_b$, $^2s_b$ and $^3s_b$ having values −1, −1 and +1, respectively, and then Eq. (7) becomes:

$$c_p = \frac{1}{3}((-1)(4+1)+(-1)(2+1)+(+1)(6+1)) = -\frac{1}{3} \quad \text{Eq. (12)}$$

The small negative value determined by Eq. (12) for the processed confidence metric indicates low confidence that the bit is a 0.

The bit-by-bit confidence metric aggregation is implemented at the aggregator using the 3-bit confidence metric representation with each data bit transmitted from the collector. A normal GSM burst has 116 coded data bits. Therefore, using 3-bit confidence metrics, an additional 348 bits of confidence metric information needs to be transmitted for each burst from each collector. In order to reduce the number of confidence metric bits further, in embodiments of the invention, the confidence metrics are grouped. One processed confidence metric can be used for different group sizes. For example, one metric can be used for every half burst of data, for every quarter burst of data or for every 4 bits of data. If 3-bit confidence metrics are grouped on a half burst basis, this requires that each burst transmit an additional 6 bits of data, 3 additional bits for the confidence metric for each half of the data segment.

The algorithm for forming one grouped confidence metric, $c_{pg}$, for a group of n confidence metrics and then aggregating is as follows. The processed grouped confidence metric, $c_{pg}$, for a group of n confidence metrics for a corresponding n data bits, with the bit number for a group indicated by the subscript, k, is given by averaging the confidence metrics of the group as follows:

$$^i c_{pg} = FLOOR\left(\frac{1}{n}\sum_{k=1}^{n} r^j\frac{c_k}{a}\right) \quad \text{Eq. (13)}$$

$$= FLOOR\left(\frac{1}{n}(r)\frac{1}{a}\sum_{k=1}^{n} {}^i c_k\right)$$

For example, for a grouping of confidence metrics for four data bits $$path1 \quad {}^1c_1 = 103.33 \quad {}^1c_2 = 80.00 \quad {}^1c_3 = 123.33 \quad {}^1c_4 = -70.00$$

$$path2 \quad {}^2c_1 = -56.67 \quad {}^2c_2 = 156.67 \quad {}^2c_3 = 80.00 \quad {}^2c_4 = 43.33$$

$$path3 \quad {}^3c_1 = 166.67 \quad {}^3c_2 = -70.00 \quad {}^3c_3 = 183.33 \quad {}^3c_4 = 186.67$$

Eq. (13) becomes:

$$^1 c_{pg} = FLOOR\left(\frac{1}{4}8\frac{1}{200}\sum_{k=1}^{4} {}^1 c_k\right) = 3 \quad \text{Eq. (15)}$$

$$^2 c_{pg} = FLOOR\left(\frac{1}{4}8\frac{1}{200}\sum_{k=1}^{4} {}^2 c_k\right) = 3$$

$$^3 c_{pg} = FLOOR\left(\frac{1}{4}8\frac{1}{200}\sum_{k=1}^{4} {}^3 c_k\right) = 6$$

The grouped values of Eq. (15) are transmitted from the three different collectors 45 to an aggregator 17. The aggregator performs the ungrouping by assigning the group value to each of the ungrouped values, one for each data bit, of a group. The signals are then aggregated, on a bit by bit basis, using voting that is weighted by the grouped metrics according to Eq. (7) as follows:

$$^{agg}c_{p1} = \frac{1}{3}((-4)+(-4)+(7)) = -.333 \quad \text{Eq. (16)}$$

$$^{agg}c_{p2} = \frac{1}{3}((4)+(4)+(-7)) = .333$$

$$^{agg}c_{p3} = \frac{1}{3}((4)+(4)+(7)) = 5$$

$$^{agg}c_{p4} = \frac{1}{3}((-4)+(4)+(7)) = 2.333$$

If grouping is done on a half burst basis using 3-bit integers for the confidence metric, Eq. (13) is as follows:

$$^i c_{pg} = FLOOR\left(\frac{1}{58}(8)\frac{1}{a+\epsilon}\sum_{k=1}^{58} {}^i c_k\right) \quad \text{Eq. (17)}$$

Weighted Averaging

In an embodiment where $N_c$ representations, $^1\beta_{pb}$, $^2\beta_{pb}, \ldots, {}^{Nc}\beta_{pb}$, of each bit are generated with confidence metrics, $^1Cm_b, {}^2Cm_b, \ldots, {}^{Nc}Cm_b$, each measured by numbers $^1s_b{}^1c_b, {}^2s_b{}^2c_b, \ldots, {}^{Nc}s_b{}^{Nc}c_b$, respectively, with each number $^\alpha s_b{}^\alpha c_b$ ranging between $(-\alpha)$ and $(+\alpha)$ and with the weighting values, $^\alpha w_b$, for each bit b, the average aggregate confidence metric, $^{agg}c_b$, for each bit b, is as follows:

$$^{agg}c_b = \frac{1}{N_c}\sum_{a=1}^{N_c} {}^\alpha w_b{}^\alpha s_b({}^\alpha c_b + 1) \quad \text{Eq. (18)}$$

Figure 10:
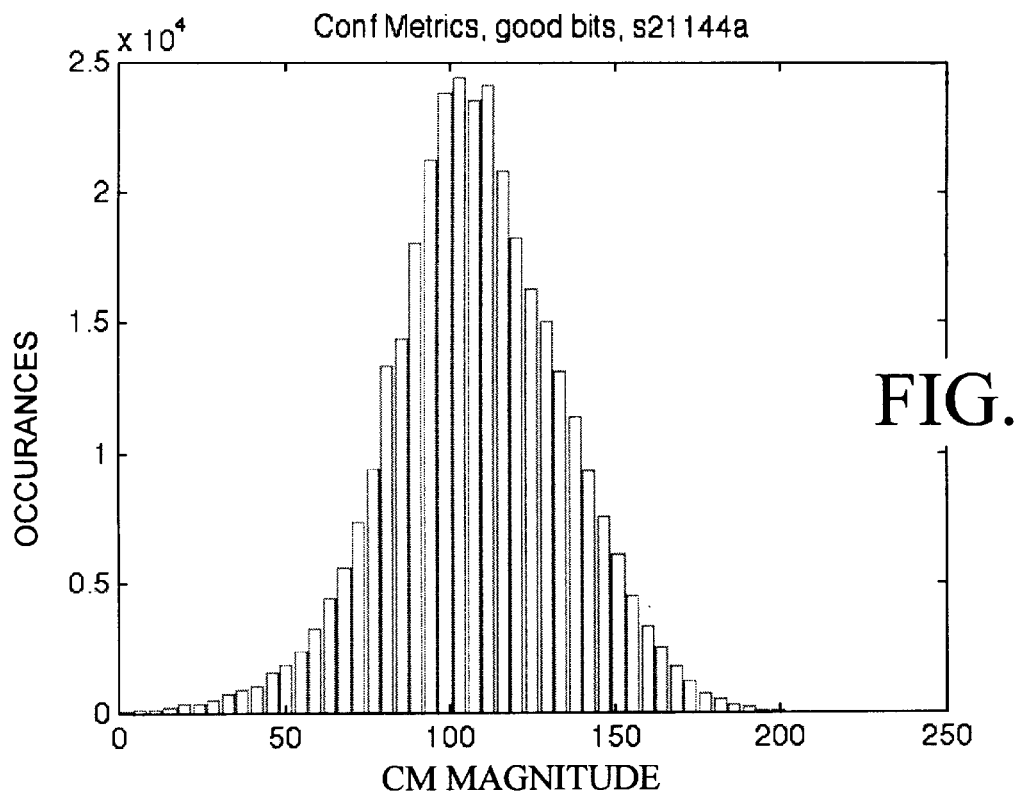
FIG. 10 depicts a graphic representation of the distribution of magnitudes of confidence metrics for known good bits for a large number of occurrences.
Figure 11:
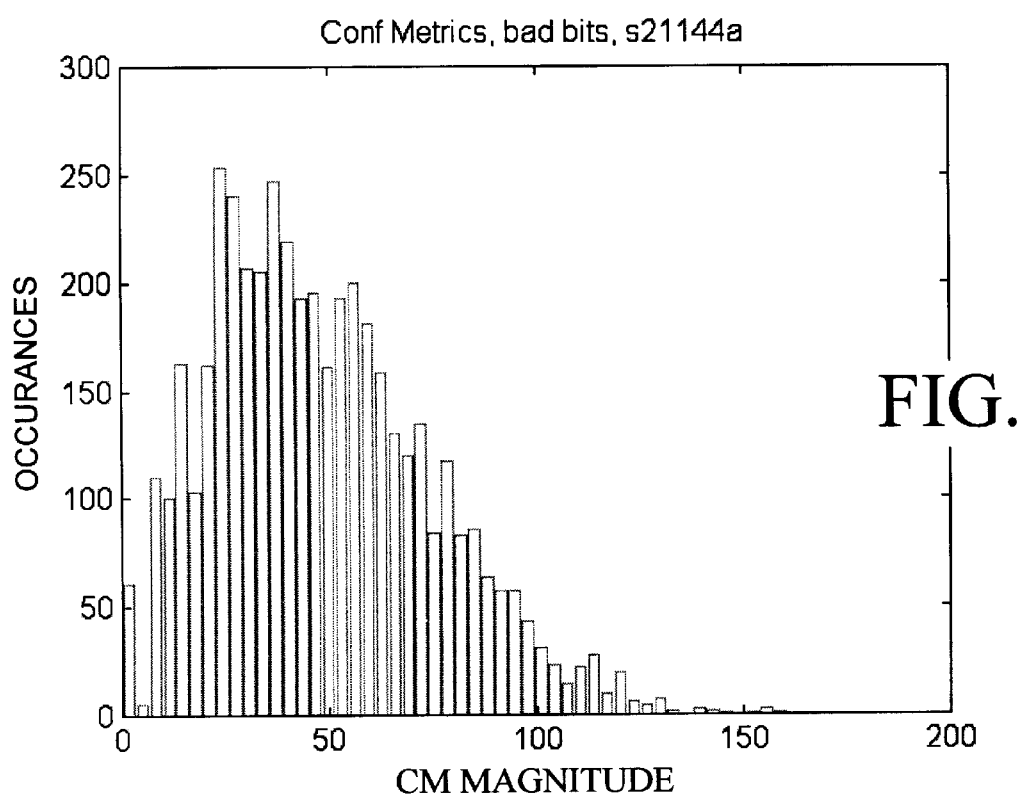
FIG. 11 depicts a graphic representation of the distribution of magnitudes of confidence metrics for known bad bits for a large number of occurrences.
Figure 12:
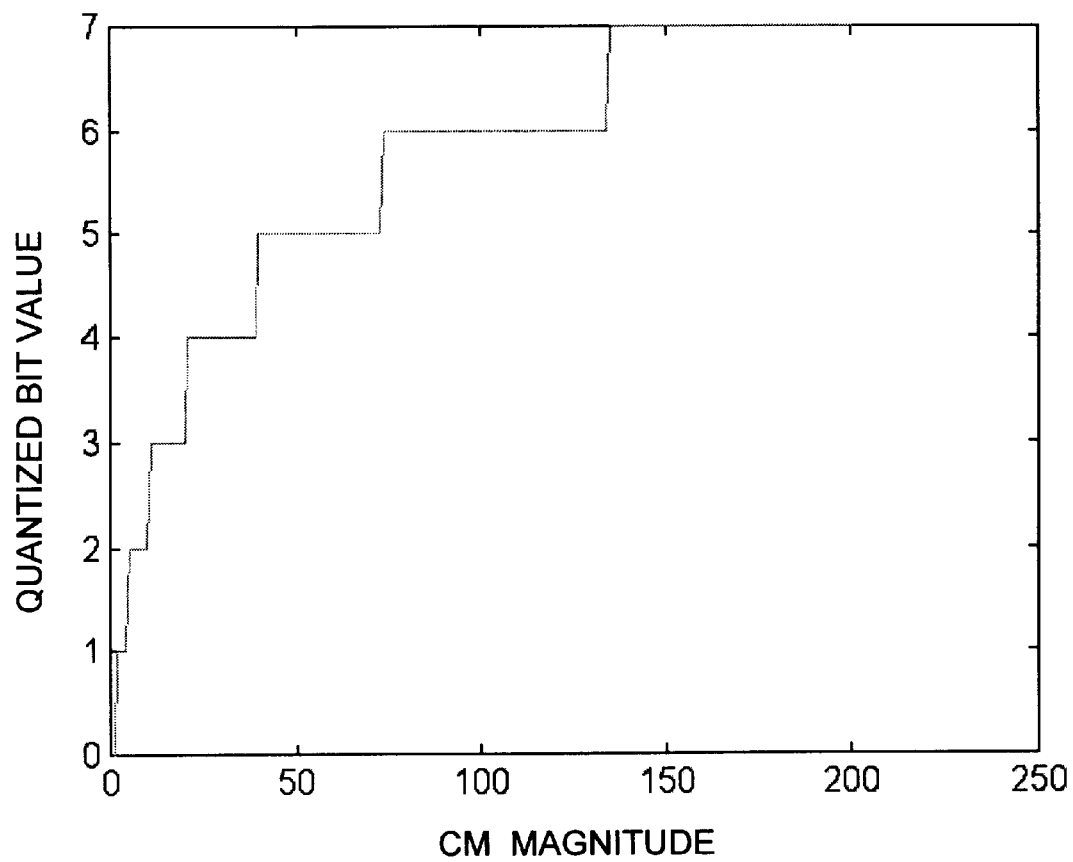
FIG. 12 depicts non-linear quantized bit values as a function of confidence metric magnitudes.

Non-linear Quantizing—FIG. 10, FIG. 11 and FIG. 12.

Alternative methods for scaling and quantizing from initial values of $\gamma_{in}$-bits for each initial confidence metric reduced to $\gamma_p$-bits for each processed confidence metric take advantage of the nature of the distributions of confidence Eq. (14)

metric magnitudes for good bits versus bad bits. Examples of such distributions are shown in FIG. 10 and FIG. 11.

One non-linear method of quantization is a logarithmic mapping function where the following logarithmic mapping function is an example:

$$c_p = ROUND\left[\frac{7}{6}\log_2\left(\frac{(c_{in}+1)(126)}{a}\right)-1\right] \quad \text{Eq. (19)}$$

The non-linear quantization of Eq. (19) is illustrated in FIG. 12 wherein a=200. The mapping of Eq. (19) achieves the same degree of compression as the linear mapping, but the aggregation gain is larger for Eq. (19). Eq. (19) has the advantage that less information is sent for the high end of the range where there is less chance of confusing good bits with bad as can be seen by comparison of FIG. 10 and FIG. 11.

Figure 13:
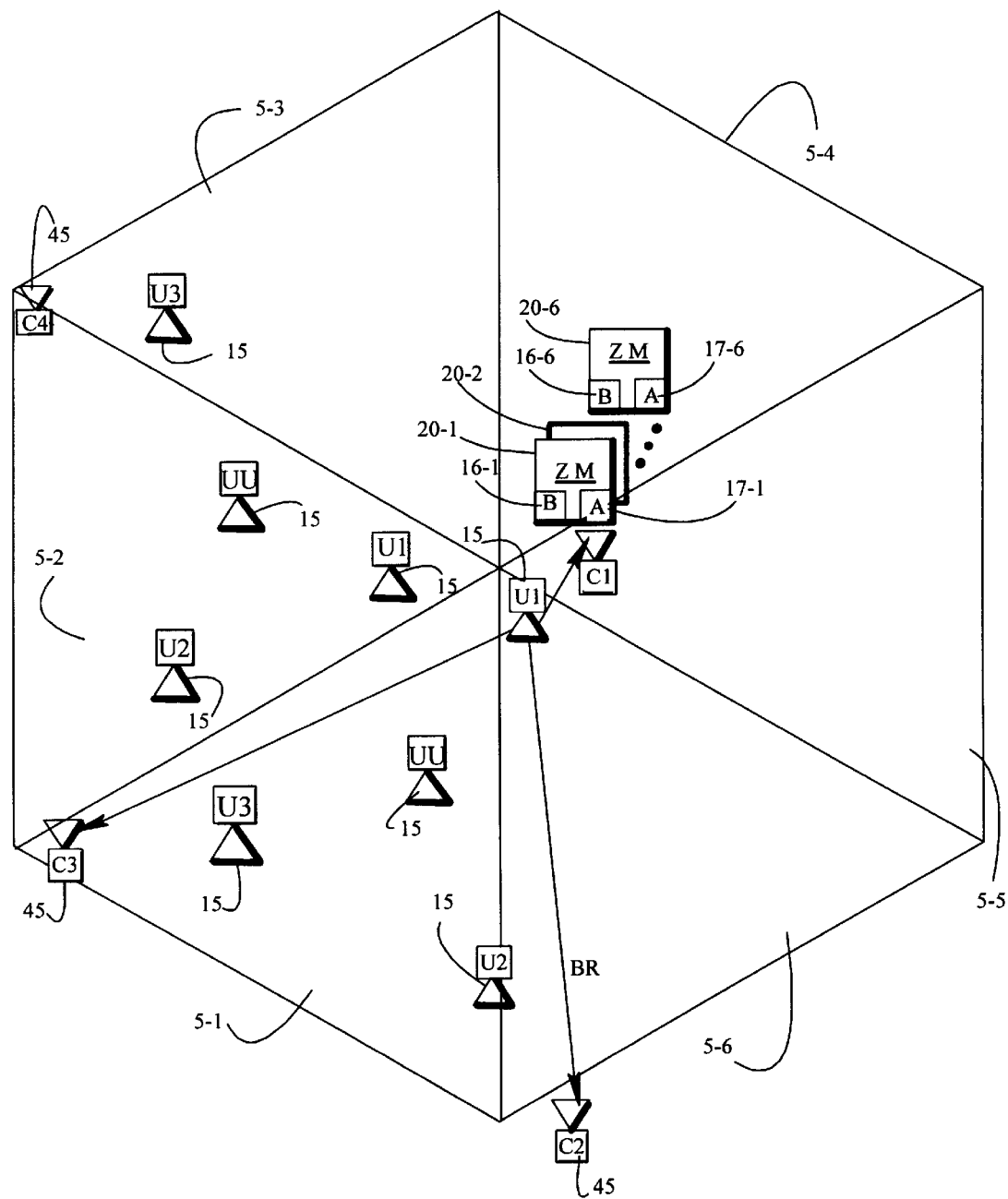
FIG. 13 depicts a block diagram representation of multiple zones of the FIG. 1 type in a cellular system.

Multiple Zone Configuration—FIG. 13

In FIG. 13, the zones 5, including the zones 5-1, 5-2, ..., 5-6, are like the zone 5 of FIG. 1 and each zone 5 includes users 15 like those for zone 5-1. For example, zone 5-2 is adjacent to zone 5-1 and includes a C4 collector 45 that operates together with at least the collectors C1 and C2 that operate with zone 5-1.

In FIG. 13, the cellular system is shown having zone managers 20-1, ..., 20-6 of which zone manager 20-1 is typical. The zone managers have broadcasters 16-1, ..., 16-6, where broadcaster 16-1 is typical, that broadcast forward channel (FC) communications to multiple users 15 in one or more of the zones 5-1, ..., 5-6. Each of the users 15 transmits reverse channel (RC) communications to one or more of multiple collectors 45 including collectors C1, C2, C3 and C4, which in turn forward the reverse channel communications to aggregators 17-1, ..., 17-6, where aggregator 17-1 is typical. The zone managers 20 can be located at a base station that is configured in a number of different ways. In one configuration, each broadcaster broadcasts forward channel communications in a different one of six sectors in six different frequency ranges corresponding to the zones 5-1, 5-2, ..., 5-6. The users in the different zones transmit reverse channels on corresponding frequency ranges to the various collectors operating in their broadcast ranges and the collectors in turn forward reverse channel communications to a corresponding one of the aggregators 17. In another configuration, all of the zones use the same frequency ranges and no sectorization is employed and in such an embodiment one or more zone managers may be employed. In general, regardless of the configuration, some collectors associated with one zone (such as collectors C1, C2 and C3 for zone 5-1) share back haul reverse channel bandwidth with collectors associated with another zone (such as collectors C1, C3 and C4 for zone 5-2) where in the example collectors C1 and C3 share for zones 5-1 and 5-2.

In order to conserve bandwidth, the confidence metric bandwidth for one zone is at times reduced in order to permit an increase in the bandwidth of another zone where the zones are sharing reverse channels communication bandwidth from common associated collectors, like collectors C1 and C3 in the example described. Control of the algorithms used in each collector for determining the bandwidth used by each collector are stored and executed in the confidence metric processing unit 49 of FIG. 4 and processing unit 70 of FIG. 8. Further, the zone manager 20 of FIG. 1 communicates with the processing units 49 and 70 over the remote interfaces 65 when adjustments, such as for bandwidth balancing, are required.

In FIG. 13, the region manager 12 controls the bandwidth allocation of the zone managers 20-1, ..., 20-6 for the contiguous regions 5-1, ..., 5-6 and for other regions 5' which may or may not be contiguous to the regions 5-1, ..., 5-6.

While the invention has been particularly shown and described with reference to preferred embodiments thereof it will be understood by those skilled in the art that various changes in form and details may be made therein without departing from the spirit and scope of the invention.

We claim:

1. A communication system having a plurality of channels comprising, a plurality of users for transmitting user signals in user channels, a plurality of macro-diverse collector means distributed at macro-diverse locations, each of said collector means including, collector receiver means for receiving said user signals and providing a plurality of received signals for each of said plurality of users, collector processing means for processing said received signals to form collector signals including sequences of data bits representing the received signals and including initial confidence metrics corresponding to said data bits for each of said plurality of users, where the initial confidence metrics are represented by an initial number of metric bits, said collector processing means including collector confidence metric processing means for processing said initial confidence metrics to form processed confidence metrics, aggregator means for combining said collector signals using said processed confidence metrics from said plurality of macro-diverse collector means for each of said plurality of users to form a final sequence of data bits representing the user signals for each of said plurality of users.

2. A communication system having a plurality of forward channel communications and a plurality of corresponding reverse channel communications comprising, a plurality of users in a broadcaster zone, each of said users including user receiver means for receiving different user forward channel signals and including user transmitter means for broadcasting user reverse channel signals in a user reverse channel, said plurality of users providing a composite signal formed of a plurality of different user reverse channels, a plurality of macro-diverse collector means distributed in proximity to said broadcaster zone at macro-diverse locations, each of said collector means including, collector receiver means including a plurality of micro-diversity receivers each for receiving said user signals and providing a plurality of micro-diverse received signals for each of said plurality of users, collector processing means for processing said received signals to form collector signals including sequences of data bits representing the received signals and including initial confidence metrics corresponding to said data bits for each of said plurality of users, where the initial confidence metrics are represented by an initial number of metric bits, said collector processing means including collector confidence metric processing means for processing said initial confidence metrics to form processed confidence metrics, zone manager means including, broadcaster means including a broadcaster transmitter for broadcasting said plurality of user forward channel signals over a broadcaster range to said users in said broadcaster zone, aggregator means for combining said collector signals from said plurality of macro-diverse collector means for each of said plurality of users to form a final sequence of data bits, using said processed confidence metrics, representing the user signals for each of said plurality of users.

3. A communication system having a plurality of forward channel communications and a plurality of corresponding reverse channel communications comprising, a plurality of users in a broadcaster zone, each of said users including user receiver means for receiving different user forward channel signals and including user transmitter means for broadcasting user reverse channel signals in a user reverse channel, said plurality of users providing a composite signal formed of a plurality of different user reverse channels, a plurality of macro-diverse collector means distributed in proximity to said broadcaster zone at macro-diverse locations, each of said collector means including, collector receiver means including a plurality of micro-diversity receivers each for receiving said user signals and providing a plurality of micro-diverse received signals for each of said plurality of users, collector processing means for processing said received signals to form collector signals including sequences of data bits representing the received signals and including initial confidence metrics corresponding to said data bits for each of said plurality of users, where the initial confidence metrics are represented by an initial number of metric bits, said collector processing means including collector confidence metric processing means for processing said initial confidence metrics to form processed confidence metrics, broadcaster means including a broadcaster transmitter for broadcasting said plurality of user forward channel signals over a broadcaster range to said users said broadcaster zone, control means for selecting ones of said plurality of collector means in a collector group for deceiving reverse channel signals from particular ones of said plurality of users, aggregator means for combining said collector signals from said plurality of macro-diverse collector means in said collector group for each of said particular ones of said plurality of users to form a final sequence of data bits, using said processed confidence metrics, representing the user signals for each of said particular ones of said plurality of users.

4. A communication system having a plurality of forward channel communications and a plurality of corresponding reverse channel communications comprising, a plurality of users in a plurality of broadcaster zones, each of said users including user receiver means for receiving different user forward channel signals and including user transmitter means for broadcasting user reverse channel signals in a user reverse channel, said plurality of users providing a composite signal formed of a plurality of different user reverse channels, a number, $N_{bm}$, of broadcaster means, each including a broadcaster transmitter for broadcasting said plurality of user forward channel signals over a broadcaster range to said users in one of said broadcaster zones, a number, $N_c$, of collector means distributed in proximity to said broadcaster zones at macro-diverse locations where the number $N_c$, of collector means is greater than the number, $N_{bm}$, of broadcaster means, each of said collector means including, collector receiver means including a plurality of micro-diversity receivers each for receiving said composite signal and providing a plurality of micro-diverse received signals for each of ones of said plurality of users, collector processing means for processing said received signals to form collector signals including sequences of data bits representing the received signals and including initial confidence metrics corresponding to said data bits for each of said plurality of users, where the initial confidence metrics are represented by an initial number of metric bits, said collector processing means including collector confidence metric processing means for processing said initial confidence metrics to form processed confidence metrics, collector forwarding means for forwarding said sequences of data bits and said processed confidence metrics as collector signals for each of said ones of said plurality of users, aggregator means for combining said macro-diverse collector signals for said each one of particular ones of the users from said collector means in said collector group to form a final sequence of data bits representing the user signals for said each one of particular ones of the users.

5. The communication system of claim 1, 2, 3, 4 wherein said collector confidence metric processing means processes said initial confidence metrics to form processed confidence metrics represented by a processed number of metric bits fewer than said initial number of metric bits.

6. The communication system of claim 1, 2, 3, 4 wherein said aggregator means includes aggregator confidence metric processing means for processing said processed confidence metrics to form aggregator confidence metrics for each of said data bits.

7. The communication system of claim 1, 2, 3, 4 wherein said collector processing means includes group processing means for processing said initial confidence metrics in groups to form said processed confidence metrics as grouped confidence metrics having grouped numbers of confidence metric bits fewer than said initial number of metric bits.

8. The communication system of claim 1, 2, 3, 4 wherein the initial confidence metrics have an initial range, $a_{in}$, represented by an initial number of metric bits, y[] and said collector confidence metric processing means includes range processing means for process the initial confidence metrics to form processed confidence metrics having a processed range, $a_p$, represented by a processed number of metric bits, $\gamma_p$, where the processed number of metric bits, $\gamma_p$ is less than the initial number of metric bits, $\gamma_{in}$.

9. The communication system of claim 8 wherein said range processing means performs linear quantization of the initial confidence metric, $Cm_i$, to form the processed confidence metric, $Cm_{pi}$, as follows:

$$Cm_{pi} = FLOOR\left[\left[\frac{Cm_i}{\max\_Cm\_\text{value} + \epsilon}\right][2^\gamma]\right]$$

where:

$Cm_{pi}$=processed confidence metric as quantized value of $Cm_i$ max_Cm_value=maximum value of $Cm_i$ i=1, 2, . . . , B $\epsilon$=small positive value chosen so that the division always produces a number less than 1.

10. The communication system of claim 9 wherein the initial confidence metrics $Cm_1$, $Cm_2$, . . . , $Cm_b$, . . . , $Cm^B$ are organized into G groups that include the groups G1, G2, ..., GG that in turn include the confidence metrics $Cm_1, ..., Cm_{g1}$ for group G1; $Cm_{(g1+1)}, ..., Cm_{g2}; ...$ ; $Cm_{(gG-1)+1}, ..., Cm_{gG}$ for group GG, where each of the confidence metrics in a group are processed to form a single processed confidence metrics $Cm_{p1}, Cm_{p2}, ..., Cm_{pi}, ..., Cm_{Pg}$ where the processed confidence metric for the $i^{th}$ group, $Cm_{pi}$, is given as follows:

$$cm_{pi} = \frac{\sum_{k=g(i)+1}^{k=g(i+1)} cm_k}{g(i+1) - g(i)}$$

where, $Cm_k = k^{th}$ initial confidence metric
$Cm_{pi}$ = processed confidence metric for the $i^{th}$ group
$g(i)+1$ = beginning confidence metric in group
$g(i+1)$ = ending confidence metric in group
$g(i+1)-g(i)$ = number of confidence metrics in group.

11. The communication system of claim 1, 2, 3, 4
wherein said collector processing means includes group processing means for processing said initial confidence metrics having an initial range, $a_{in}$, represented by an initial number of metric bits, $\gamma_{in}$, in groups, $Cm_1, ..., Cm_G$, to form grouped confidence metrics including the confidence metrics $Cm_1, ..., Cm_{g1}$ for group G1; $Cm_{(g1+1)}, ..., Cm_{g2}$; for group G2; ...; $Cm_{(g3+1)}, ..., Cm_{gG}$ for group GG having grouped numbers of confidence metric bits, $\gamma_g$, fewer than said initial number of metric bits, and wherein said collector confidence metric processing means includes range processing means for processing the grouped confidence metrics having an initial mange, $a_{in}$, represented by an initial number of metric bits, $\gamma_{in}$, to form processed confidence metrics having a processed range, $a_p$, represented by a processed number of metric bits, $\gamma_p$, where the processed number of metric bits, $\gamma_p$ is less than the initial number of metric bits, $\gamma_{in}$.

12. The communication system of claim 11 wherein said range processing means performs linear quantization of the initial confidence metric, $Cm_i$, to form the processed confidence metric, $Cm_{pi}$, as follows:

$$cm_{pi} = FLOOR\left[\left[\frac{cm_i}{max\_Cm\_value + \epsilon}\right][2^\gamma]\right]$$

where:

$Cm_{pi}$ = processed confidence metric as quantized value of $Cm_i$
max_Cm_value = maximum value of $Cm_i$
i = 1, 2, ..., B
$\epsilon$ = small positive value chosen so that the division always produces a number less than 1.

13. The communication system of claim 1, 2, 3, 4
wherein said collector processing means includes group processing means for processing said initial confidence metrics in groups to form said processed confidence metrics as grouped confidence metrics having grouped numbers of confidence metric bits fewer than said initial number of metric bits, wherein said aggregator means includes aggregator confidence metric processing means for processing said processed confidence metrics to form aggregator confidence metrics for each of said data bits.

14. The communication system of claim 13 wherein the initial confidence metrics $Cm_1, Cm_2, ..., Cm_b, ..., Cm_B$ are organized into G groups that include the groups G1, G2, ..., GG that in turn include the confidence metrics $Cm_1, ..., Cm_{g1}$ for group G1; $Cm_{(g1+1)}, ..., Cm_{g2}; ...$ ; $Cm_{(gG-1)+1}, ..., Cm_{gG}$ for group GG, where each of the confidence metrics in a group are processed to form a single processed confidence metrics $Cm_{p1}, Cm_{p2}, ..., Cm_{pi}, ..., Cm_{Pg}$ where the processed confidence metric for the $i^{th}$ group, $Cm_{pi}$, is given as follows:

$$cm_{pi} = \frac{\sum_{k=g(i)+1}^{k=g(i+1)} cm_k}{g(i+1) - g(i)}$$

where, $Cm_k = k^{th}$ initial confidence metric
$Cm_{pi}$ = processed confidence metic for the $i^{th}$ group
$g(i)+1$ = beginning confidence metric in group
$g(i+1)$ = ending confidence metric in group
$g(i+1)-g(i)$ = number of confidence metrics in group.

15. The communication system of claim 1, 2, 3, 4
wherein the initial confidence metrics have an initial range, $a_{in}$, represented by an initial number of metric bits, $\gamma_{in}$, and said collector confidence metric processing means includes range processing means for processing the initial confidence metrics to form processed confidence metrics having a processed range, $a_p$, represented by a processed number of metric bits, $\gamma_p$, where the processed number of metric bits, $\gamma_p$ is less than the initial number of metric bits, $\gamma_{in}$, wherein said aggregator means includes aggregator confidence metric processing means for processing said processed confidence metrics to form aggregator confidence metrics for each of said data bits.

16. The communication system of claim 15 wherein said range processing means performs linear quantization of the initial confidence metric, $Cm_i$, to form the processed confidence metric, $Cm_{pi}$, as follows:

$$cm_{pi} = FLOOR\left[\left[\frac{cm_i}{max\_Cm\_value + \epsilon}\right][2^\gamma]\right]$$

where:

$Cm_{pi}$ = processed confidence metic as quantized value of $Cm_i$
max_Cm_value = maximum value of $Cm_i$
i = 1, 2, ..., B
$\epsilon$ = small positive value chosen so that the division always produces a number less than 1.

17. The communication system of claims 16 wherein the initial confidence metrics $Cm_1, Cm_2, ..., Cm_b, ..., Cm_B$ are organized into G groups that include the groups G1, G2, ..., GG that in turn include the confidence metrics $Cm_1, ..., Cm_{g1}$ for group G1; $Cm_{(g1+1)}, ..., Cm_{g2}, ...$ ; $Cm_{(gG-1)+1}, ..., Cm_{gG}$ for group GG, where each of the confidence metrics in a group are processed to form a single processed confidence metrics $Cm_{p1}, Cm_{p2}, ..., Cm_{pi}, ..., Cm_{Pg}$ where the processed confidence metric for the $i^{th}$ group, $Cm_{pi}$, is given as follows:

$$cm_{pi} = \frac{\sum_{k=g(i)+1}^{k=g(i+1)} cm_k}{g(i+1)-g(i)}$$

where, $Cm_k = k^{th}$ initial confidence metric $Cm_{pi}$=processed confidence metric for the $i^{th}$ group g(i)+1=beginning confidence metric in group g(i+1)=ending confidence metric in group g(i+1)−g(i)=number of confidence metrics in group.

18. The communication system of claim 1, 2, 3, 4 wherein said collector processing means includes group processing means for processing said initial confidence metrics having an initial range, $a_{in}$, represented by an initial number of metric bits, $\gamma_{in}$, in groups, $Cm_1, \ldots, Cm_G$, to form grouped confidence metrics including the confidence metrics $Cm_1, \ldots, Cm_{g1}$ for group G1; $Cm_{(g1+1)}, \ldots, Cm_{g2}$; for group G2; ...; $Cm_{(gl+1)}, \ldots, Cm_{gG}$ for group GG having grouped numbers of confidence metric bits, $\gamma_g$, fewer than said initial number of metric bits, wherein said collector confidence metric processing means includes range processing means for processing the grouped confidence metrics having an initial range, $a_{in}$, represented by an initial number of metric bits, $\gamma_{in}$, to form processed confidence metrics having a processed range, $a_p$, represented by a processed number of metric bits, $\gamma_p$, where the processed number of metric bits, $\gamma_p$ is less than the initial number of metric bits, $\gamma_{in}$, wherein said aggregator means includes aggregator confidence metric processing means for processing said processed confidence metrics to form aggregator confidence metrics for each of said data bits.

19. The communication system of claim 18 wherein said range processing means performs linear quantization of the initial confidence metric, $Cm_i$, to form the processed confidence metric, $Cm_{pi}$, as follows:

where:

$Cm_{pi}$=processed confidence metic as quantized value of C max_Cm_value=maximum value of $Cm_i$ i=1, 2, . . . , B ε=small positive value chosen so that the division always produces a number leas than 1.

20. The communication system of claim 1, 2, 3, 4 wherein said collector confidence metric processing means includes input register means for storing initial confidence metrics, a collector confidence metric processor for processing the initial confidence metrics using a processing algorithm to form processed confidence metrics, a confidence metric store for storing algorithm information for determining said processing algorithm, and output means for storing the processed confidence metrics.

21. The communication system of claim 1, 2, 3, 4 wherein said collector confidence metric processing means includes remote interface means for remotely communicating confidence metric processing information.

22. The communication system of claim 1, 2, 3, 4 wherein said aggregator confidence metric processing means includes input register means for storing processed confidence metrics, an a e confidence metric processor for processing the processed confidence metrics using a processing algorithm to form processed confidence metrics, a confidence metric store for storing algorithm information for determining said processing algorithm, and output register means for storing output confidence metrics.

23. The communication system of claim 1, 2, 3, 4 wherein said aggregator confidence metric processing means includes remote interface means for remotely communicating confidence metric processing information.

24. The communication system of claim 1, 2, 3, 4 wherein, said collector receiver means includes a plurality of micro-diversity receivers each for receiving said user signals and providing a plurality of micro-diverse received signals for each of said plurality of users, said collector processing means processes said micro-diverse received signals to form said collector signals including sequences of data bits representing the micro-diverse received signals and including said initial confidence metrics corresponding to said data bits for each of said plurality of users.

25. The communication system of claim 1, 2, 3, 4 wherein said aggregator mows receives, from $N_c$ of said collector means, $N_c$ macro-diverse collector signals each having a processed confidence metric value, $^\alpha c_b$ for each bit and combines said processed confidence metric values to form an average processed confidence metric, $^{agg}c_b$, as follows:

$$^{agg}c_b = \frac{1}{N_c}\sum_{\alpha=1}^{N_c} {}^\alpha s_b(^\alpha c_b + 1)$$

where, $^{agg}c_b$=average processed confidence metric $^\alpha c_b$=number ranging between (0) and (+α)

$^\alpha s_b$=sign $N_c$=number of macro-diverse collector signals.

26. The communication system of claim 1, 2, 3, 4 wherein said aggregator means receives, from $N_c$ of said collector means, $N_c$ macro-diverse collector signals each having a processed confidence metric value, $_\alpha c_b$ for each bit and each having a weighting factor, $^\alpha w_b$, for each bit and combines said processed confidence metric values to form a weighted average confidence metric, $^{agg}c_b$, as follows:

$$^{agg}c_b = \frac{1}{N_c}\sum_{\alpha=1}^{N_c} {}^\alpha w_b {}^\alpha s_b(^\alpha c_b + 1)$$

where, $^{agg}c_b$=weighted average processed confidence metric $^\alpha c_b$=number $^\alpha s_b$=sign $N_c$=number of macro-diverse collector signals $^\alpha w_b$=weighting factor for each bit.

27. The communication system of claim 1, 2, 3, 4 wherein said initial confidence metric for each bit is in the form of a number, $c_b$, where (0)<$c_b$<(+α) and where α is an amplitude represented by one or more bits to indicate the range for $c_b$.

28. The communication system of claim 1, 2, 3, 4 wherein, said collector processing means includes signal measurement means for providing measurement signals measuring properties of the received user signals, said aggregator means includes measurement processor means receiving said measurement signals for controlling which ones of said collector signals are combined.

29. The communication system of claim 1, 2, 3, 4 wherein said aggregator means includes a signal processor having a macro-diversity combiner unit for combining said processed confidence metrics from two or more of said macro-diverse collector signals and forms a logical 1 or logical 0 value for each bit of said sequence of data bits based on combined processed confidence metrics.

30. The communication system of claim 29 wherein said signal processor includes a de-interleaver, a de-convolution unit and a block decoder.

31. The communication system of claim 1, 2, 3, 4 wherein said aggregator means includes an aggregator signal processor having, a plurality of macro-diversity combiner units each for combining said confidence metrics from two or more of said macro-diverse collector signals to form a logical 1 or logical 0 value for each bit of said sequence of data bits based on combined confidence metrics, first selector means for selecting different ones of the macro-diverse collector signals for inputs to different ones of the macro-diversity combiner units, second selector means for selecting one of the outputs from the macro-diversity combiner units to form said final sequence of data bits.

32. The communication system of claim 31 wherein said signal processor includes a macro-diversity combiner, a de-interleaver, a de-convolution unit and a block decoder.

33. The communication system of claim 1, 2, 3, 4 wherein said user signals employ multiple access protocols.

34. The communication system of claim 33 wherein said user signals employ TDMA protocols.

35. The communication system of claim 33 wherein said user signals employ CDMA protocols.

36. The communication system of claim 33 wherein said user signals employ SDMA protocols.

37. The communication system of claim 33 wherein said user signals employ FDMA protocols.

38. In a communication system having a plurality of channels, having a plurality of users for transmitting user signals in user channels, and having a plucky of macro-diverse collector means distributed at macro-diverse locations, the method comprising:

for each of said collector means,
receiving said user signals and providing a plurality of received signals for each of said plurality of users,
processing said received signals to form collector signals including sequences of data bits representing the received signals and including initial confidence metrics corresponding to said data bits for each of said plurality of users, where the initial confidence metrics are represented by an initial number of metric bits,
said processing including collector confidence metric processing for processing said initial confidence metrics to form processed confidence metrics, combining said collector signals using said processed confidence metrics from said plurality of macro-diverse collector means for each of said plurality of users to form a final sequence of data bits representing the user signals for each of said plurality of users.

* * * * *